United States Patent
Keller et al.

(10) Patent No.: US 6,688,037 B2
(45) Date of Patent: *Feb. 10, 2004

(54) ROBOTIC SEED-PLANTING APPARATUS AND METHODS

(75) Inventors: Douglas O. Keller, Lake Oswego, OR (US); Troy M. Swartwood, Seattle, WA (US); Jeffrey D. Donaldson, Tigard, OR (US)

(73) Assignee: Agrinomics LLC, Portland, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 10/020,654

(22) Filed: Dec. 12, 2001

(65) Prior Publication Data

US 2003/0106258 A1 Jun. 12, 2003

Related U.S. Application Data

(63) Continuation of application No. 09/939,333, filed on Aug. 24, 2001.
(60) Provisional application No. 60/227,898, filed on Aug. 25, 2000, and provisional application No. 60/261,511, filed on Jan. 12, 2001.

(51) Int. Cl.⁷ ................................................ A01G 9/08
(52) U.S. Cl. ..................................... 47/1.01 P; 414/737
(58) Field of Search ........................ 47/1.01 P, 1.01 R; 414/737, 744.1, 687; 111/185; 294/64.1

(56) References Cited

U.S. PATENT DOCUMENTS

| | | | |
|---|---|---|---|
| 792,958 A | 6/1905 | Bagger | |
| 2,546,838 A | 3/1951 | Tasche | |
| 3,738,530 A | 6/1973 | Fine et al. | |
| 3,929,234 A * | 12/1975 | Warren | 414/737 |
| 3,986,638 A | 10/1976 | DeHart | |
| 4,106,414 A | 8/1978 | Vastag | |
| 4,228,864 A | 10/1980 | Berger et al. | |
| 4,627,190 A * | 12/1986 | Little | 47/1.01 R |
| 4,998,945 A * | 3/1991 | Holt et al. | 47/1.01 R |
| 5,222,854 A * | 6/1993 | Blatt et al. | 198/463.3 |
| 5,321,212 A | 6/1994 | Wadell | |
| 5,350,269 A * | 9/1994 | Azuma et al. | 414/416.08 |
| 5,385,441 A * | 1/1995 | Swapp et al. | 414/627 |
| 5,414,955 A * | 5/1995 | Morin | 47/1.01 R |
| 5,452,981 A * | 9/1995 | Crorey et al. | 198/468.6 |
| 5,573,558 A * | 11/1996 | Huang | 47/1.01 R |
| 6,053,220 A * | 4/2000 | Lo et al. | 141/129 |
| 6,150,158 A | 11/2000 | Bhide et al. | |
| 6,213,709 B1 * | 4/2001 | Hebrank | 414/737 |
| 6,283,051 B1 | 9/2001 | Yoss | |
| 6,359,454 B1 * | 3/2002 | Khoury | 324/754 |
| 2002/0070150 A1 * | 6/2002 | Keller et al. | 209/643 |

FOREIGN PATENT DOCUMENTS

WO   WO 97/20209   6/1997

* cited by examiner

Primary Examiner—Peter M. Poon
Assistant Examiner—Jeffrey L. Gellner
(74) Attorney, Agent, or Firm—Klarquist Sparkman, LLP

(57) ABSTRACT

Robotic apparatus for removing seeds contained in covered or uncovered containers and planting the seeds into selected planting chambers are disclosed. An exemplary apparatus includes a first vacuum-activated probe configured to pick up an entire seed population from a donor container. A seed-alignment trough is provided to receive the seed population from the first probe. The seed-alignment trough is configured such that seeds deposited in the trough become aligned or otherwise arranged. A second vacuum-activated probe is configured to successively remove individual seeds from the seed-alignment trough and to plant each removed seed in a selected planting chamber. Also disclosed are automated methods for transferring and planting

34 Claims, 14 Drawing Sheets

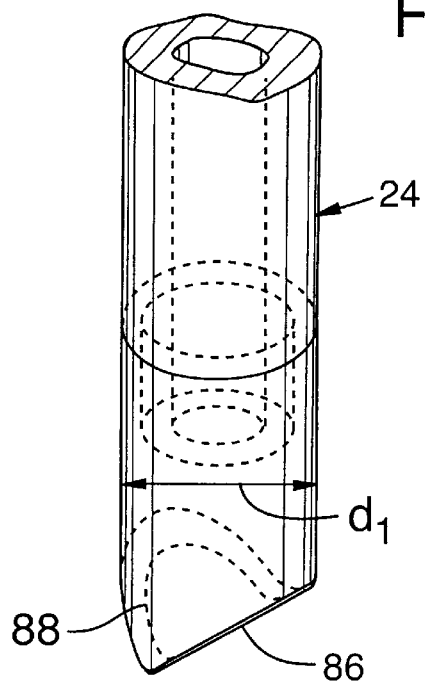
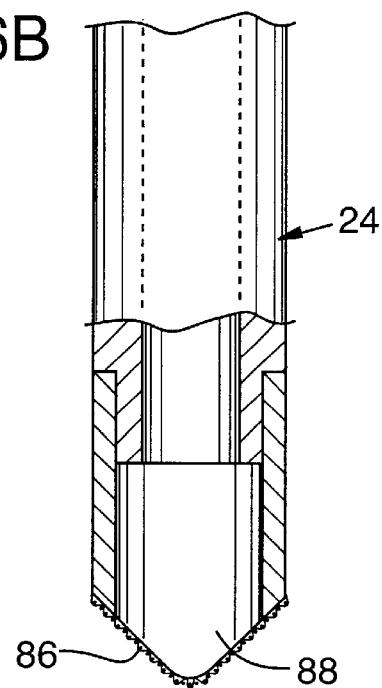
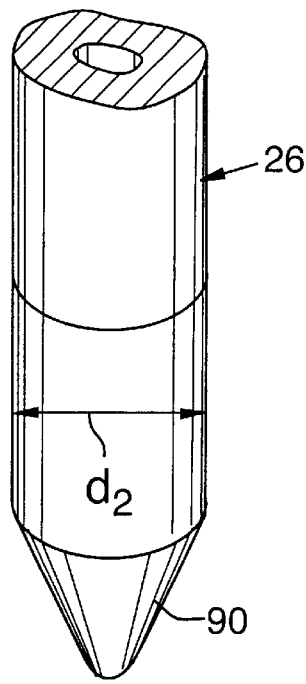
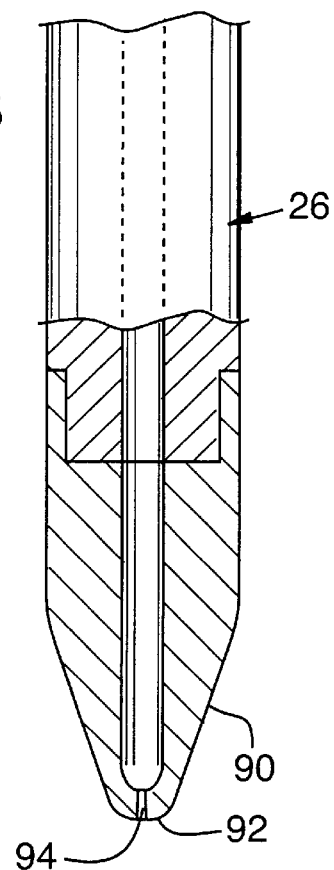

ROBOTIC SEED-PLANTING APPARATUS AND METHODS

CROSS-REFERENCE TO RELATED APPLICATIONS

This application is a continuation-in-part of U.S. application Ser. No. 09/939,333, filed Aug. 24, 2001, which claims priority to U.S. Provisional Application Ser. No. 60/227,898, filed Aug. 25, 2000, and U.S. Provisional Application No. Ser. 60/261,511, filed Jan. 12, 2001.

FIELD

The present invention relates to robotic apparatus and methods for automatically removing seeds from donor locations (e.g., containers) and planting the seeds at planting locations (e.g., planting chambers).

BACKGROUND

Many types of horticultural and agricultural operations, both in a research and in a production context, involve manipulations of plant seeds and other units of plant reproductive material. For example, certain operations involve seed sorting, seed weighing, seed planting, and analogous tasks. These tasks are labor-intensive and repetitive.

The scale of modern horticultural operations, as well as other operations involving propagation of plants, is continuing to increase. With large-scale horticultural operations, it is readily appreciated that tasks such as seed manipulation, sorting, weighing, and planting ordinarily require large number of monotonous man-hours for completion. The enormous time and labor costs associated with these tasks can be prohibitive.

Hence, there is a need for automated equipment capable of performing any of various horticulturally related tasks such as seed planting.

SUMMARY

According to one representative embodiment, a robotic apparatus for planting seeds is provided. A robotic assembly of the apparatus is configured to move in three-dimensional space. A seed manipulator is carried by the robotic assembly to be positioned by the robotic assembly at selected locations in the three-dimensional space. The seed manipulator includes a probe having an end surface that is pervious to air. The probe is fluidly connectable to a vacuum source so that application of a vacuum from the vacuum source to the probe is effective to cause the end surface of the probe to pick up at least one seed whenever the end surface of the probe is positioned at a selected first location proximate to the seed. Release of the vacuum from the probe causes the end surface of the probe to release the seed at a selected second location, such as in a planting chamber. To facilitate release of the seed from the end surface of the probe, the probe may be fluidly connected to a pressurized fluid source for selectively introducing a pressurized fluid into the probe.

The apparatus also may include a cover-removal manipulator for removing and replacing a cover on a container containing seeds to be planted. The cover-removal manipulator may be carried by or mounted to the robotic assembly, along with the seed manipulator, to be the positioned by the robotic assembly at selected locations in the three-dimensional space. Alternatively, the cover-removal manipulator and the seed manipulator may be configured for independent motion on their own respective robotic assemblies.

In addition, a seed-alignment container may be provided for use in planting seeds. The seed-alignment container is configured such that seeds, when deposited in the seed-alignment container, form a row of seeds dispersed along a surface of the container. Aligning seeds in this manner allows a seed sample comprising a selected number of seeds (e.g., as few as one seed) to be removed from a larger seed population more easily with the probe than removing a seed sample from a seed population contained in a conventional seed donor jar.

In an illustrated embodiment, the seed manipulator comprises a first probe and a second probe. The first probe desirably has an end surface configured to pick up an undefined number of seeds. The second probe, in contrast, desirably has an end surface configured to pick up a selected number of seeds. The first probe may be used for picking up a seed population at a first location (e.g., from a donor seed container) and depositing the seeds in the seed-alignment container. The second probe may be used for removing a selected number of seeds from the seed population contained the seed-alignment container and planting the seeds in a planting chamber.

An apparatus for planting seeds according to another representative embodiment comprises a first probe having an end surface configured to pick up a plurality of seeds whenever vacuum is applied to the probe and the end surface is positioned proximate the plurality of seeds. A seed-dispersing container may be provided for receiving the plurality of seeds from the first probe and dispersing the seeds along a surface thereof. A second probe may be provided for picking up and planting seeds deposited in the seed-dispersing container. The second probe has an end surface configured to pick up a seed sample comprising a selected number of seeds whenever vacuum is applied to the probe and the end surface is positioned proximate the seeds in the seed-dispersing container.

A vacuum sensor may be provided for sensing and indicating the vacuum in the second probe for use in determining whether the second probe has picked up any seeds. In a disclosed embodiment, a controller is in communication with the vacuum sensor to read the output from the vacuum sensor. If a decrease in vacuum is detected, indicating that a seed sample has been picked up on the end surface of the second probe, the controller automatically moves the second probe to a selected location for planting the seed sample.

According to yet another representative embodiment, an apparatus is provided for removing seeds contained in a donor container and planting the seeds in selected planting cells. The apparatus comprises a seed-removal means for removing seeds from the donor container. A seed-alignment means may be provided for receiving seeds from the seed-removal means and aligning the seeds in a row. A seed-planting means may be provided for removing seeds from the alignment means and planting the seeds in selected planting cells.

The seed-removal means and the seed-planting means may be configured to be movable to selected positions in three-dimensional space for picking up and releasing seeds. In addition, controlling means may be provided for controlling the movement of the seed-removal means and the seed-planting means to selected positions in three-dimensional space.

An apparatus for planting seeds according to another representative embodiment comprises a first probe and a second probe configured to move in three-dimensional space. The first and second probes are fluidly connectable to a vacuum source. The first probe has an air-pervious end surface so that application of a vacuum from the vacuum source to the first probe is effective to cause the end surface to pick up a plurality of seeds at a selected first position. Release of the vacuum from the first probe causes the end surface of the first probe to release the seeds at a selected second position. The second probe has an end surface defining a selected number of apertures. The second probe is operable to pick up a selected number of seeds at the second position, upon application of a vacuum from the vacuum source to the second probe. Release of the vacuum from the second probe causes the end surface of the second probe to release the selected number of seeds at a selected third position for planting the seeds.

In another representative embodiment, an apparatus for planting seeds comprises a probe device having an apertured end surface. The probe device is fluidly connectable to a vacuum source such that, upon application of a vacuum from the vacuum source to the probe device, seeds are picked up on the end surface of the probe device. A vacuum sensing device may be operatively connected to the probe device for sensing the vacuum in the probe device, thereby detecting whether the end surface has picked up any seeds.

A method for planting seeds, according to one embodiment, comprises depositing a plurality of seeds in a seed-alignment trough to form a row of seeds aligned along a surface in the seed-alignment trough. A seed sample, comprising a selected number of seeds, less than the plurality of seeds, is removed from the seed-alignment trough and planted at a selected location. Additional seed samples may be successively removed from the seed-alignment trough and planted at respective, separate locations. In a disclosed method, seeds are removed one at a time from the seed-alignment trough and deposited in respective planting cells.

According to yet another embodiment, a method for transferring seeds contained in a donor container to selected planting chambers comprises removing multiple seeds from the donor container. The multiple seeds are then deposited in a seed-alignment container. A planting step includes removing a selected number of seeds, which may be less than the plurality of seeds, from the seed-alignment container and planting the seeds in a respective planting chamber. The planting step may be repeated until a desired number of seeds have been planted.

In another method for planting seeds, a probe having an apertured end portion is positioned at a first position to remove at least one seed from a donor container. A vacuum is applied to the probe to cause the first probe to pick up at least one seed. The probe is then positioned at a second position to deposit the at least one seed into a planter chamber, at which point the vacuum to the probe is removed to cause the seed to be released into the planter chamber.

These and other features of the invention will be more fully appreciated when the following detailed description of the invention is read in conjunction with the accompanying drawings.

BRIEF DESCRIPTION OF THE DRAWINGS

FIG. 6A is an enlarged, perspective view of the lower end portion of the first probe.

FIG. 6B is an enlarged view of the first probe shown partially in section.

FIG. 7A is an enlarged, perspective view of the lower end portion of the second probe.

FIG. 7B is an enlarged view of the second probe shown partially in section.

DETAILED DESCRIPTION

The methods for picking up, planting, or otherwise handling seeds with the robotic apparatus described herein may be implemented in software stored on a computer-readable medium and executed on a general-purpose computer. For clarity, only those aspects of the software germane to the invention are described; product details well-known in the art are omitted. For the same reason, the computer hardware is not described in further detail. In addition, the software can be implemented as hardware. It should thus be understood that the invention is not limited to any specific computer language, program or computer.

Figure 1:
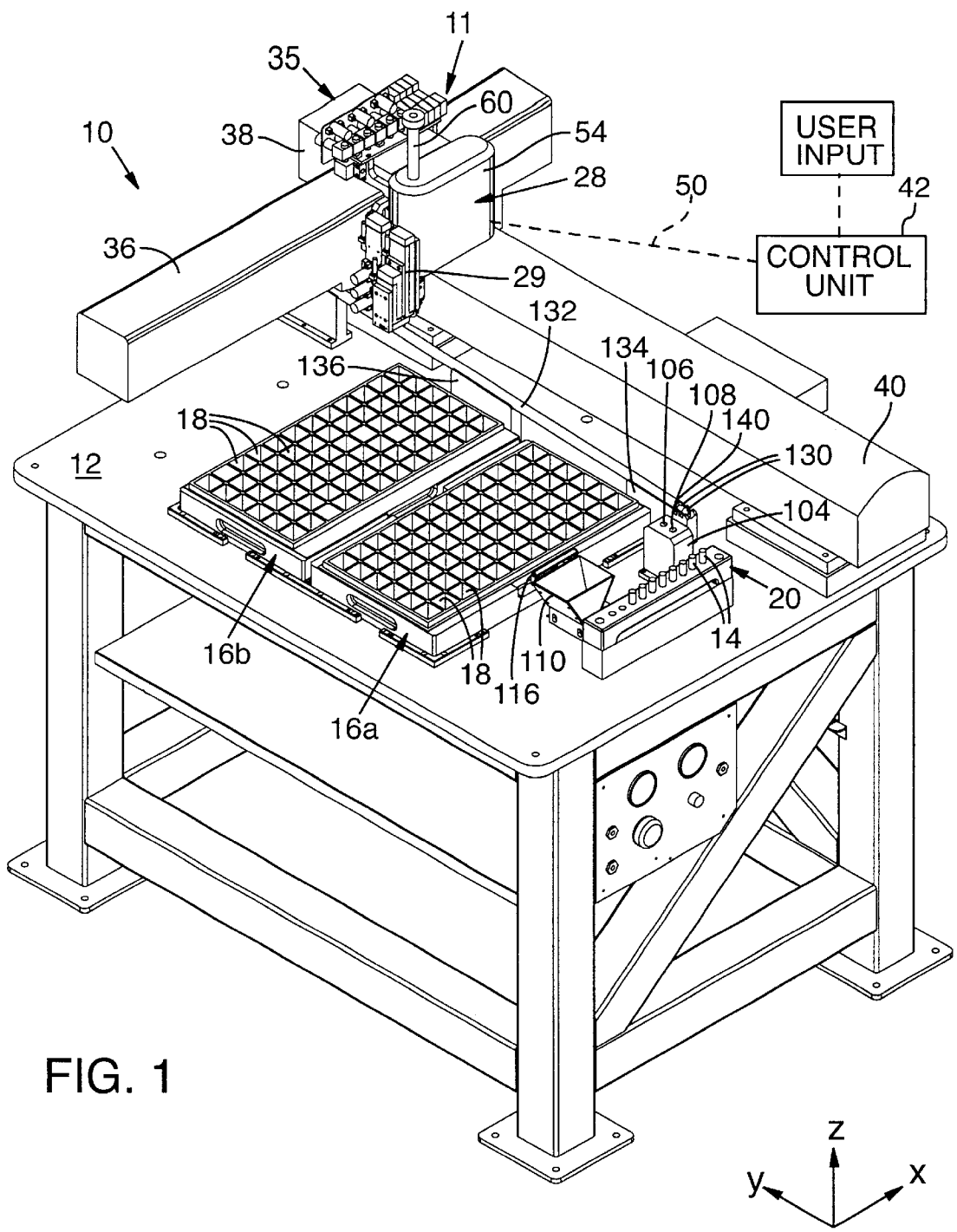
FIG. 1 is a perspective view of a seed-planting apparatus according to one embodiment, shown here with eight donor containers and two planting trays, each having a 6×12 array of planting chambers.
Figure 2:
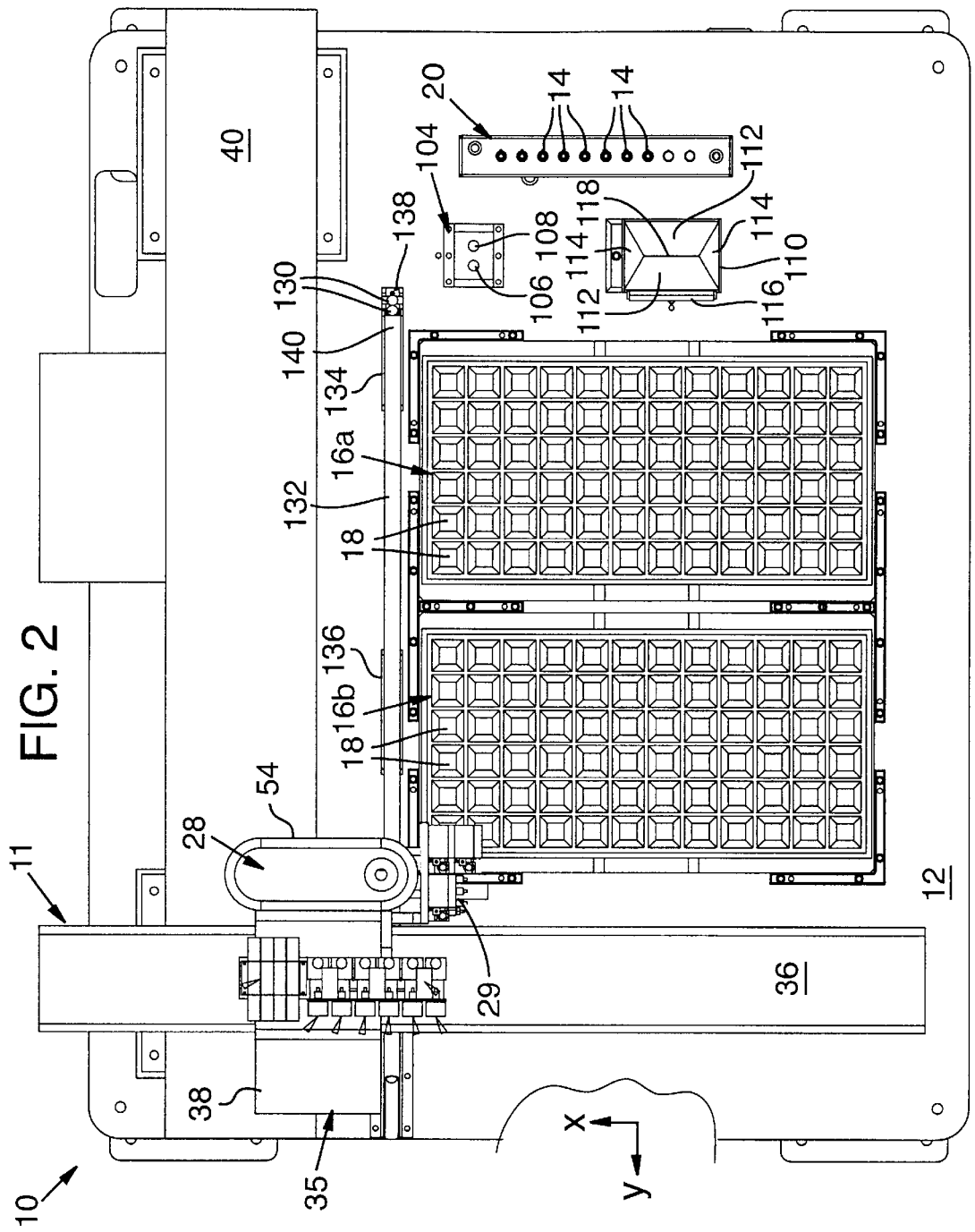
FIG. 2 is a top plan view of the apparatus of FIG. 1.

Referring first to FIGS. 1 and 2, there is shown a robotic apparatus 10 according to one embodiment for planting seeds. FIGS. 1 and 2 show perspective and plan views, respectively, of the apparatus 10. As shown, the apparatus 10 generally includes a support surface 12, for supporting a plurality of donor, or population, containers 14 that contain seeds to be planted, and first and second planting trays, or pallets 16a, 16b, respectively. The donor containers 14 may be carried by a container support 20, which in the illustrated embodiment comprises a horizontally supported plate having apertures sized to receive individual donor containers 14. Each of the first and second planting trays 16a, 16b, respectively, comprises a plurality of planting chambers 18 (also referred to as planting cells or cavities), which are adapted to receive a small quantity of planting soil and one or more seeds from a donor container 14.

Positioned on the support surface 12 between the first planting tray 16a and the container support 20 is a seed-alignment trough 110 (also referred to herein as a seed-dispersing container or a seed-alignment container in other embodiments). As best shown in FIG. 2, the seed-alignment trough 110 in the illustrated embodiment has a substantially V-shaped configuration with inclined side surfaces 112 that intersect at a bottom 118 surface of the trough 110. The seed-alignment trough 110 also includes inclined end surfaces 114 and an open top portion for receiving seeds. When seeds (e.g., seeds from a donor container 14) are deposited in the trough 110, the seeds are directed toward the bottom of the trough by the inclined surfaces 112, 114, thereby forming a row of seeds discretely arrayed along the bottom 118 of the trough 110. As will be described in greater detail below, aligning the seeds in this manner allows a seed sample comprising a selected number of seeds to be removed from a larger seed population with a seed manipulator (described below) more easily than removing a seed sample from a seed population contained in a donor container 14.

In other embodiments, the seed-alignment trough 110 may have other shapes. For example, the seed-alignment trough 110 may have a curved, or arcuate, bottom surface.

As best shown in FIG. 2, an air knife 116 can be mounted adjacent the alignment trough 110. The air knife 116 is fluidly connectable to a pressurized gas source (e.g., compressed air). When activated, the air knife 116 directs a stream of compressed gas into the trough 110 to remove any seed debris remaining in the trough 110 between successive seed-planting operations.

The donor containers 14 may comprise standard seed-sample jars or tubes, which typically can hold up to several hundred seeds per jar. The containers 14 may have covers or caps, such as screw-on or twist-on caps, corks or rubber stoppers, or any of various other suitable coverings that serve to shield and/or capture the seeds within the containers. In addition, other forms of containers also may be used. For example, the containers may comprise cavities or wells formed in the surface of a plate. For the purposes of illustrating the cap-removal feature of the apparatus 10, the containers in the illustrated embodiment comprise jars adapted for receiving a twist-on cap or cover.

In the embodiment shown, the first and second planting trays 16a, 16b, respectively, comprise a 6×12 array of individual planting chambers 18 (72 planting chambers per planting tray), although planting trays comprising a larger or smaller number of planting chambers also may be used. As one example, planting trays having a 13×22 array of individual planting chambers may be used (286 planting chambers per planting tray).

Figure 5:
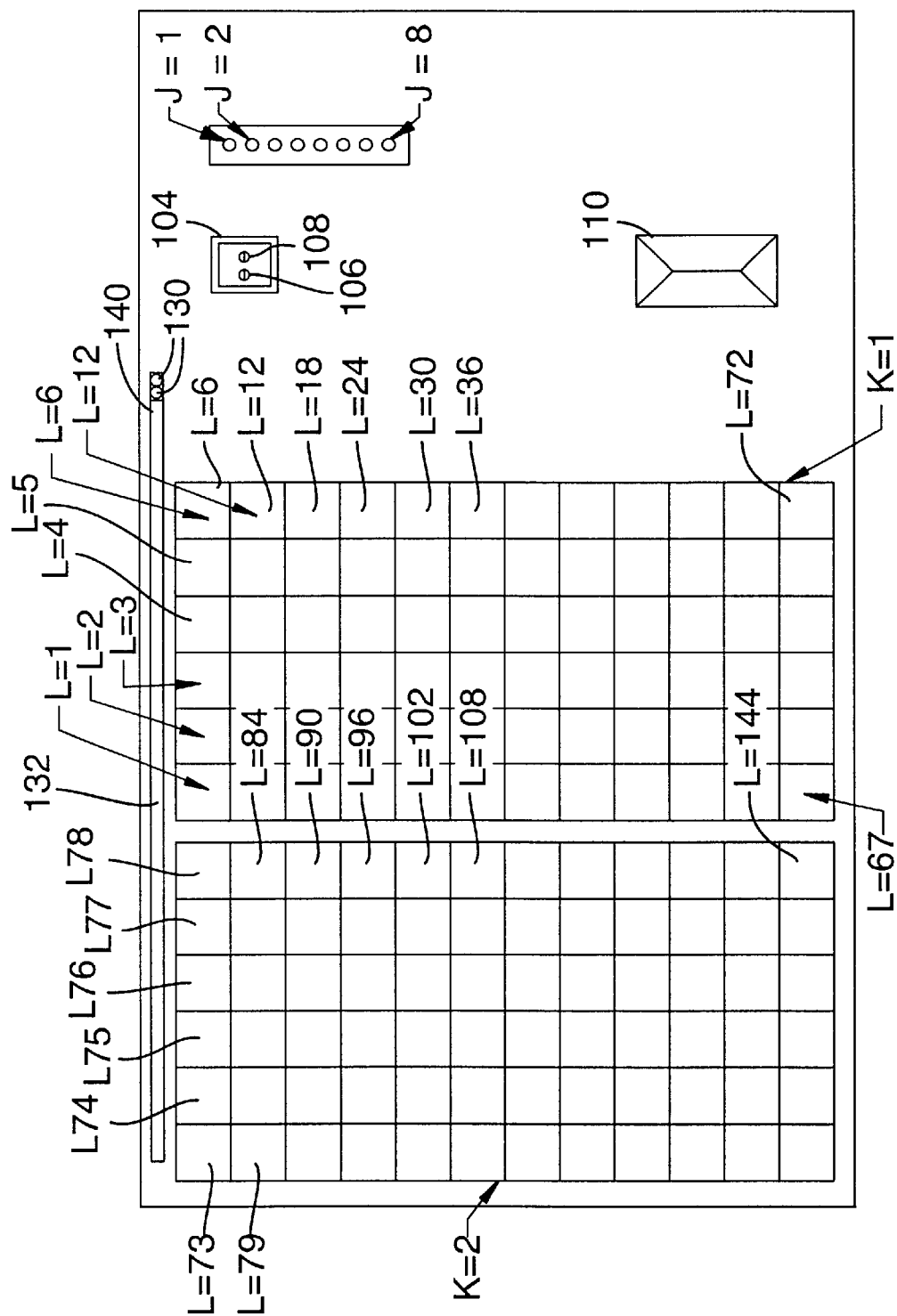
FIG. 5 is an enlarged, top plan view of the support of the apparatus of FIGS. 1 and 2, showing respective numbering of the planting trays, planting chambers, and donor jars for purposes of operating the apparatus as detailed in FIGS. 9A–9I.

As shown in FIG. 5, for purposes of illustrating the operation of the apparatus 10, the first planting tray 16a may be identified by a tray-identification number K=1 and the second plating tray 16b is identified by a tray-identification number K=2. Each planting chamber 18 of the first planting tray 16a is identified by a respective chamber-identification number L=1 to L=72, progressing in a right-to-left, top-to-bottom direction. Each planting chamber 18 of the second planting tray 16b is identified by a respective chamber-identification number L=73 to L=144, progressing in a right-to-left, top-to-bottom direction. Each planting chamber 18 is supported at known x-y coordinates on the support surface 12. Thus, by specifying the chamber-identification number of a chamber, and the tray-identification number of the tray, which contains the chamber, the x-y coordinates, and therefore the position of that chamber may be determined.

The apparatus 10 includes a robot assembly 11 comprising a robotic head assembly 28 operable to move in three-dimensional space. In the illustrated embodiment, for example, the robotic head assembly 28 is configured to move in Cartesian x, y, and z directions relative to the support. However, the space in which the robotic assembly moves may be defined by other coordinate systems, such as a polar coordinate system. The robotic head assembly 28 also may be adapted to remove and replace caps from donor containers and then transfer seeds from donor containers to selected planting chambers.

Figure 3:
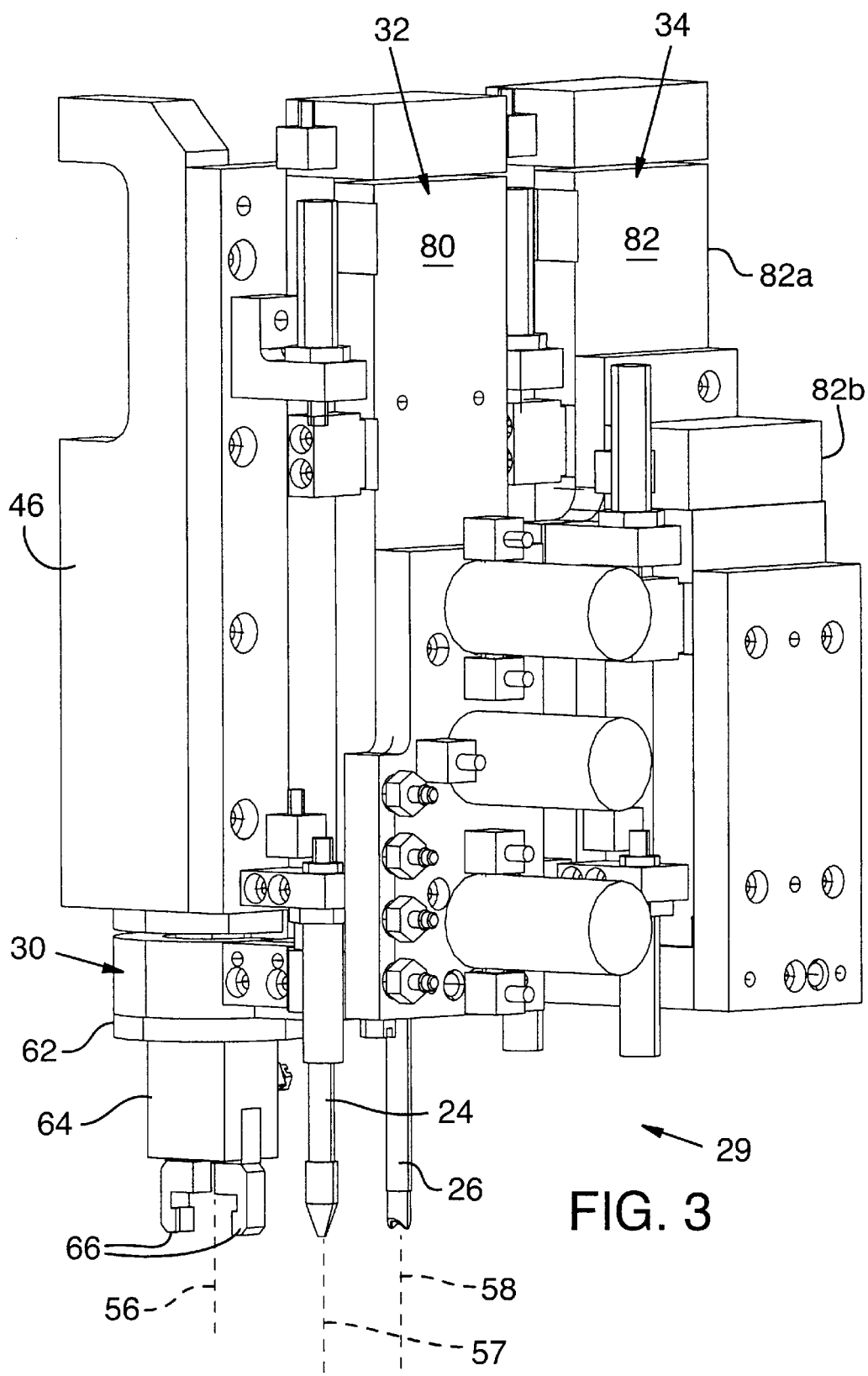
FIGS. 3 and 4 are respective perspective views of the manipulator assembly of the apparatus of FIG. 1, comprising first and second seed manipulators having first and second probe devices, respectively, for picking up and releasing seeds, and a cover-removal manipulator.
Figure 4:
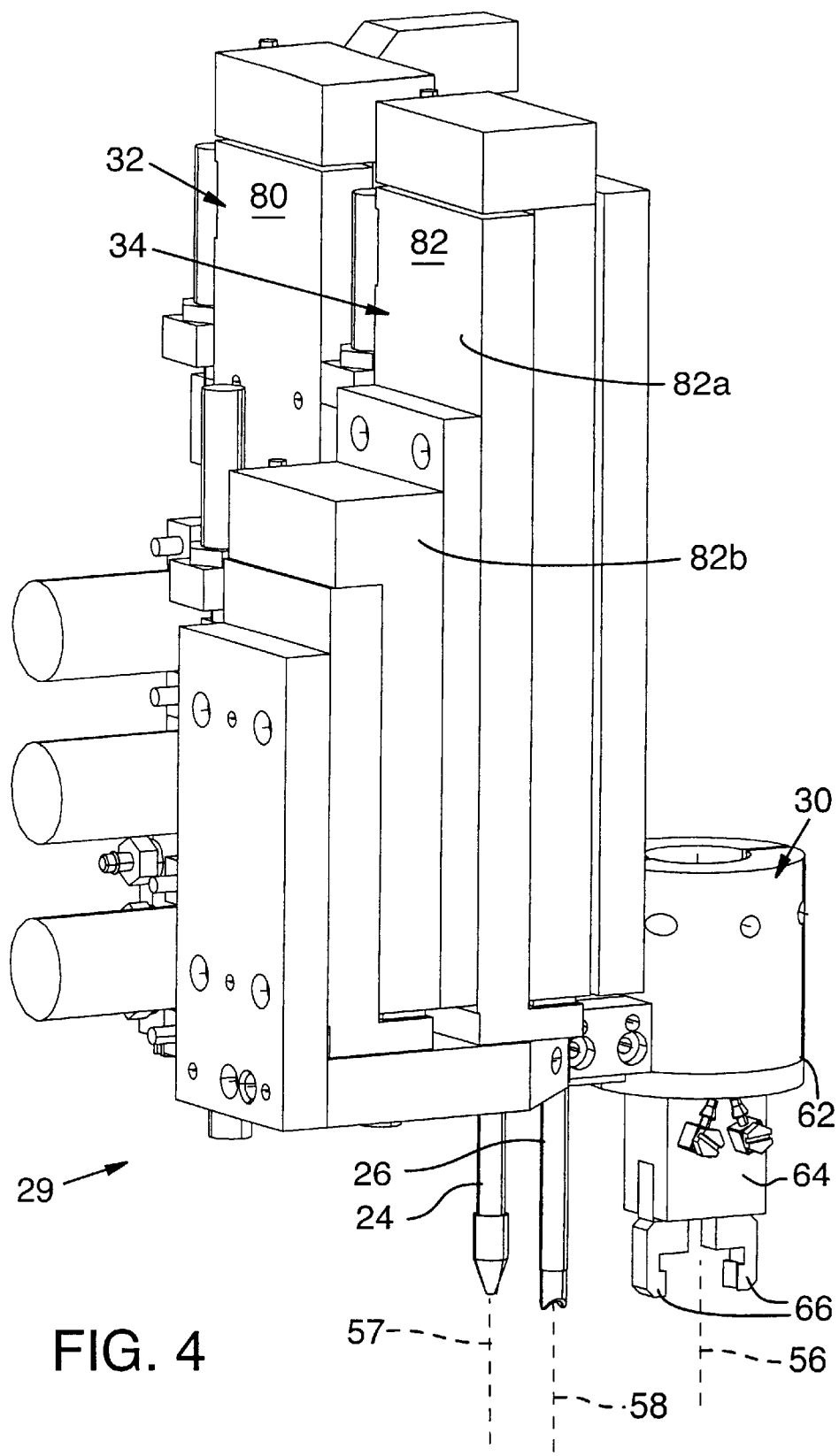

As shown in FIGS. 1 and 2, the robotic head assembly 28 in the illustrated configuration comprises a manipulator assembly 29 mounted to a support 54. FIGS. 3 and 4 show enlarged views the manipulator assembly 29 with the support 54 removed for clarity. As shown, the manipulator assembly 29 in the illustrated configuration includes a cover-removal manipulator 30 for removing and replacing a cover on ajar at a selected x-y-z position, and one or more seed manipulators, such as a first seed manipulator 32 and a second seed manipulator 34, for picking up and releasing seeds at a selected x-y-z position. The first and second seed manipulators 32 and 34 are each independently movable in the z-direction and have first and second probes 24 and 26, respectively, that are operable for picking up and depositing seeds, as will be described more fully below.

Other forms for the robotic assembly also may be used. For example, if the apparatus is used in connection with only uncovered containers, the cover-removal manipulator 30 may be optional. Still alternatively, the cover-removal manipulator 30 and each of the first and second seed manipulators 32, 34, respectively, may be mounted for independent movement relative to each other on their own respective movable head assemblies.

The head assembly 28 (FIGS. 1 and 2) is movable to selected x-y positions with respect to the support surface 12. For example, as shown in FIGS. 1 and 2, the head assembly 28 is mounted to or carried by a carriage 35. The carriage 35 includes an assembly mount 38 on which the robotic head assembly 28 is mounted. The assembly mount 38 is mounted for translational movement along a track 36 extending in the x-axis direction parallel to the plane of the support surface 12 for positioning the assembly mount 38, and thereby the head assembly 28, at a selected x-axis coordinate. The track 36, with the assembly mount 38 and head assembly 28, are mounted for translational movement along a track 40 that extends in the y-axis direction parallel to the plane of the support surface 12 for positioning the head assembly 28 at a selected y-axis coordinate. Movements of the carriage 35 along the track 40 and of the assembly mount 38 along the track 36 to selected x-y coordinates are controlled by suitable respective drive mechanisms (not shown) operatively connected to the carriage 35 and assembly mount 38, as is well known is the art. The drive mechanisms may comprise, for example, belt-coupled motors, linear electromagnetic motors, or the like. In a working embodiment of the apparatus 10, the robotic assembly 11 comprises a Seiko Cartesion model XM3106b11, which includes a robotic head assembly to which the cover-removal manipulator 30 and the first and second seed manipulators 32 and 34, respectively, are mounted.

Suitable drive mechanisms also are provided for moving the cover-removal manipulator 30 and probes 24 and 26 individually to selected z-axis positions (i.e., toward and away from the support surface 12) during operation of the apparatus 10. These drive mechanisms are conventional, and well known to those of skill in the art.

Control of the drive mechanisms to place the head assembly 28 at selected x-y coordinates and to place each of the cover-removed manipulator 30 and probes 24, 26 at a selected z-axis coordinate is through a control unit 42 (FIG. 1) operatively connected to the robotic assembly at 50. As shown, the control unit 42 desirably receives user input 44. The construction of the control unit 42, either as a hardwired processor or as a software-driven processor, will be appreciated from the description of the operation of the control unit 42 described below with reference to FIGS. 9A–9I.

The cover-removal manipulator 30 is carried on the lower end of a slide rod 60 (FIG. 1) for movement therewith as the slide rod 60 is raised and lowered along a z-axis 56 (FIGS. 3 and 4) to selected z-axis positions. The slide rod 60 also is operable to rotate about the z-axis 56 for causing rotation of the cover-removal manipulator 30 about the same axis. As shown in FIG. 3, the first and second seed manipulators 32 and 34, respectively, may be mounted to a bracket 46. Each of the first and second seed manipulators 32, 34, respectively, comprises a respective slide 80, 82 coupled to the respective probes 24, 26. Movement of the slides 80, 82 causes movement of their respective probes 24, 26 along respective z-axes 57, 58, respectively. As noted above, the movements of the cover-removal manipulator 30 and each of probes 24, 26 along their respective z-axes are independently controlled by respective drive mechanisms under the control of the control unit 42.

The slide 82 may further comprise a first slide 82a coupled to a second slide 82b, which in turn carries the second probe 26. The first and second slides 82a, 82b, respectively, are independently movable for moving the second probe 26 to selected positions along the z-axis 58.

Construction and translational control of the three z-direction drive mechanisms can be conventional. In the illustrated embodiment, for example, the slides 80, 82a, and 82b are bi-directional, air-actuated slides. The slide 80 is fluidly connectable to a compressed air source (not shown) to operate the slide 80 between a retracted position in which the first probe 24 is in a raised position (shown in FIGS. 3 and 4) and an extended position in which the first probe 24 is in a lowered position. The slides 82a and 82b are also fluidly connectable to a compressed air source to operate the slides 82a and 82b between respective retracted and extended positions. In the embodiment of FIGS. 3 and 4, the second probe 26 can be placed at four positions along the z-axis: (1) a first, uppermost position with both slides 82a, 82b in their retracted positions (FIGS. 3 and 4), (2) a second position below the first position with the first slide 82a retracted and the second slide 82b extended, (3) a third position below the second position with the first slide 82a extended and the second slide 82b retracted, and (4) a fourth position below the third positions with both slides 82a, 82b in their extended positions.

In a working embodiment, the slides 80 and 82a comprise, for example, model number MXS8-75-ASR air slides and the slide 82b comprises a model number MXS8-40-ASR air slide, which are available from SMC Pneumatics Inc.

The first probe 24 is coupled to the slide 80 for movement with the slide 80 toward and away from the support surface 12 along the z-axis 57. The first probe 24 is in fluid communication with a vacuum source (not shown) and, optionally, a source of high-pressure gas (e.g., 90 psig) (not shown) and a source of low-pressure gas (e.g., 1–2 psig) (not shown), such as respective compressed-air sources. Control of vacuum and compressed gas to the slide 80 is provided by a suitable valving arrangement, such as one or more solenoid-actuated valves, connected to the vacuum and pressure sources and under the control of the control unit 42.

Figure 8:
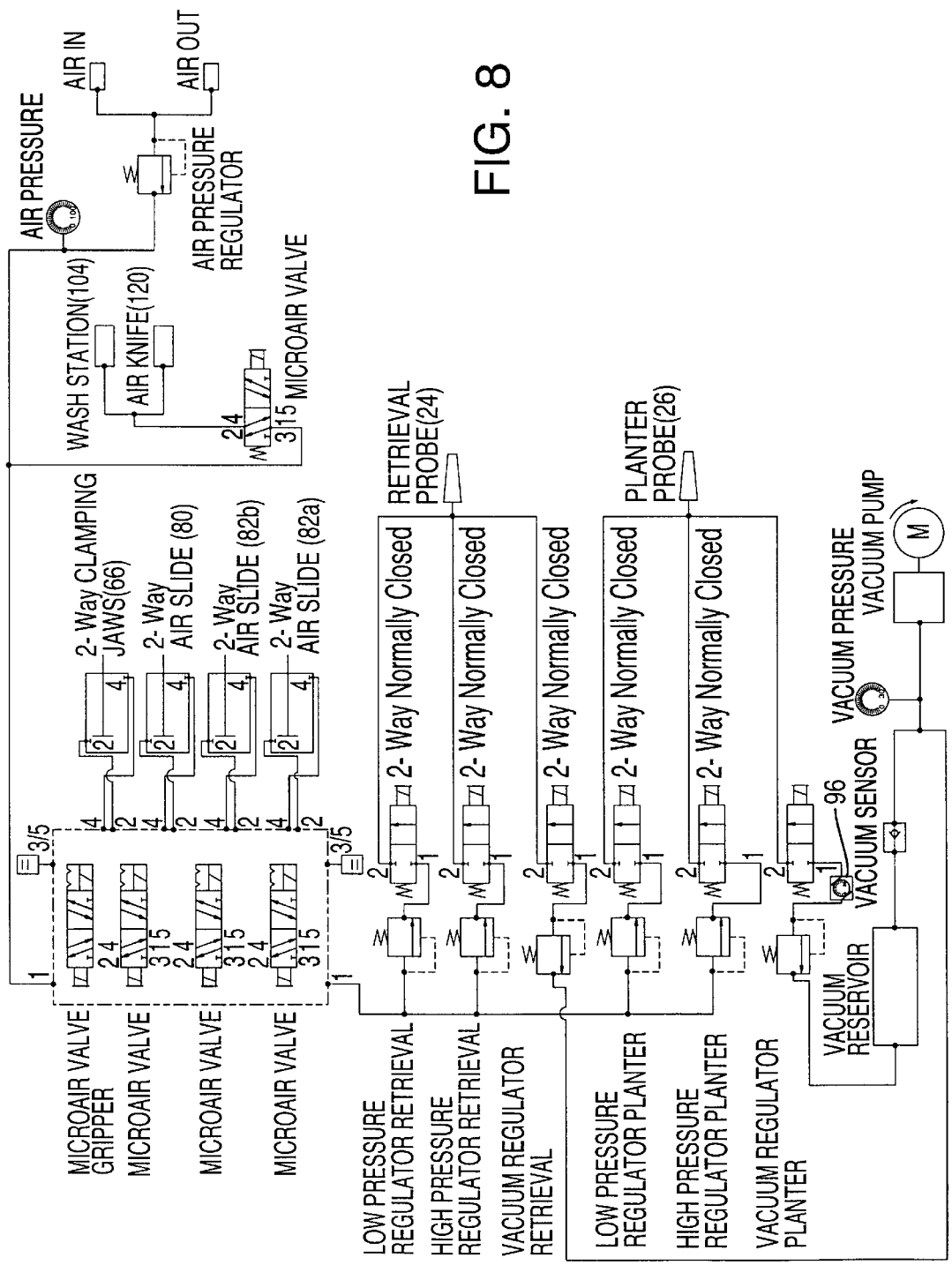
FIG. 8 is a valving schematic for the vacuum and compressed air sources according to one embodiment.

The second probe 26 likewise is coupled to the slide 82 for movement with the slide 82 toward and away from the support surface 12 along the z-axis 58. The second probe 26 also is in fluid communication with the vacuum source and, optionally, the sources of high- and low-pressure compressed gas (e.g., air), through a suitable valving arrangement. FIG. 8 is a diagram showing one example of a valving schematic for the vacuum and compressed air sources supplying the slides 80, 82, the probes 24, 26, and clamping jaws 66 (described below).

Referring again to FIGS. 3 and 4, the details of the cover-removal manipulator 30 will now be described. As shown, the cover-removal manipulator 30 comprises a head 62 mounted on the lower end of the slide rod 60 (FIG. 1). A clamp 64 is mounted on the lower end of the head 62. As mentioned, the slide rod 60 may be rotated to cause a corresponding rotation of the cover-removal manipulator 30 about the z-axis 56. The clamp 64, in turn, includes a pair of clamping jaws 66 designed to move toward and away from one another to clamp and release, respectively, the outer rim of a cap on a seed container of the type described above. The clamping jaws 66 may be covered on the respective inwardly facing surfaces with an elastomeric material to accommodate slight variations in cap diameters, and to provide greater frictional contact with the caps. Drive mechanisms for moving the clamping jaws 66 toward and away from one another, and for rotating the clamp 64 to a desired angular orientation about the z-axis 56 are conventional and under the control of the control unit 42.

To remove a cover from ajar, the jaws 66 are moved into position to engage the cover, and the clamp 64 (with jaws 66) is rotated, for example, in the counterclockwise direction. An anti-rotational tab (not shown) of the jar received in a slot in the container support 20 prevents rotation of the jar as the clamp is rotated so as to permit rotation of the cover relative to the jar. The cap of a standard seed-sample jar, such as used in the seed-planting methods described herein, has a typical outer diameter of about 1.5 to 3 cm and is completely screwed on or off the threads of a jar with about one to two full rotations of the clamp 64.

The first probe 24 (also referred to herein as the "retrieval" probe) desirably is configured to pick up an indeterminate quantity of seeds whenever the end of the first probe 24 is near or in contact with the upper surfaces of the seeds, and a vacuum is applied to the probe. In contrast, the second probe 26 (also referred to herein as the "planter" probe) desirably is configured to pick up a selected number of seeds that corresponds to the number of seeds to be planted in a planting chamber 18.

Generally, in one approach for planting seeds with the apparatus 10, the first probe 24 is used for picking up an entire seed population contained in a donor jar 14 and transferring the seeds to the seed-alignment trough 110. After the seed population has been deposited in the seed-alignment trough 110, the second probe 26 can be used for successively removing individual seed samples, each sample comprising a selected number of seeds, from the trough 110 and planting each seed sample into a selected planting chamber 18. As used herein, the term "to plant" means to deposit or release seeds into a selected planting chamber. In addition, the first probe 24 can be used for picking up any additional seeds that remain in the alignment trough 110 after a seed-planting operation and transferring those seeds back to the donor jar 14 from which the seeds were originally removed.

Referring to FIGS. 6A and 6B, the first probe 24 has a lower end portion 88 with an end surface 86 that is generally pervious to air. In the illustrated configuration, for example, the end surface 86 comprises a fine-mesh screen, although other forms for the end surface 86 also may be used. For example, in other embodiments, the end surface can define a plurality of apertures or openings. Still alternatively, the end surface 86 may comprise a cloth or fabric-type material that is generally pervious to air. In any case, with application of a vacuum to the first probe 24, and whenever the first probe 24 is positioned over seeds, an indeterminate quantity of the seeds will be drawn against and captured by the first probe. As used herein, whenever a probe "picks up" a seed or other particle, the seed is immobilized on the end surface of the probe without passing through the end surface. Seeds can be released from the end surface 86 of the first probe 24 by release of the vacuum. Seed release may be facilitated by application of a low-pressure fluid (e.g., 1–2 psig compressed air) to the probe from a compressed gas source.

In addition, to facilitate removal of seeds from the alignment trough 110 with the first probe 24, the lower end portion 88 may have a generally V-shaped cross section (as best shown in FIG. 6B) that corresponds to the shape of the alignment trough 110. This ensures that the end surface 86 of the first probe 24 can be lowered to a position that is sufficiently close enough to the bottom of the trough 110 to enable the vacuum to draw seeds against the end surface 86. In other embodiments, the first probe 24 may be provided with a lower end portion that is not shaped to correspond with the shape of the alignment trough 110. For example, the first probe 24 may have a cylindrical lower end portion with a flat end surface, such as shown in copending U.S. application Ser. No. 09/939,333.

The diameter $d_1$ of the first probe 24 desirably is between about 3–5 mm, with 4.75 mm being a specific example, although larger or smaller diameter probes are contemplated, depending on seed size and the number of seeds to be picked up. Each opening in the mesh end surface 86 desirably is smaller than the dimensions of a seed to prevent passage of seeds through the mesh surface. The mesh surface in one specific implementation typically has a mesh size of about 10–20 openings/mm$^2$.

These dimensions are suitable, for example, for seeds of *Arabidopsis thaliana*, which are about 230–260 microns in diameter, and have a per-seed mass of about 15–25 micrograms. Of course, those skilled in the art will realize that the specific dimensions for the first probe 24 provided above (as well as other dimensions provided in the present application) are given to illustrate the invention and not to limit it. These dimensions can be modified as needed in different applications or situations. For example, a relatively larger mesh size with smaller openings may be used for smaller seeds and a relatively smaller mesh size with larger openings may be used for larger seeds.

Details of one embodiment of the second probe 26 are shown in FIGS. 7A and 7B. As shown, the second probe 26 in the illustrated configuration has a generally frusto-conical-shaped lower end portion 90, which, as the lower end portion 88 of the first probe 24, corresponds with the shape of the seed-alignment trough 110 to facilitate removal of seeds from the alignment trough 110 with the second probe 26. The lower end portion 90 of the second probe may comprise other shapes. For example, in other embodiments, the lower end portion of the second probe 26 may be cylindrical, rectangular or any of other various shapes.

The second probe 26 may have an end surface that defines a selected number of openings or apertures for picking up a corresponding selected number of seeds. As shown in FIG. 7B, for example, the lower end portion 90 has an end surface 92 that defines a single aperture, or opening 94 for picking up one seed on the end surface 92 of the second probe 26. The aperture 94 is dimensioned smaller than a seed to be picked up using the second probe 26. Thus, with application of a vacuum to the second probe 26, and whenever the lower end portion 90 of the second probe 26 is positioned at or near a seed, the seed will be drawn against the end surface 92 at the aperture 94. The seed can be released from the end surface 92 of the second probe 26 by release of the vacuum. Seed release may be facilitated by application of a low-pressure fluid (e.g., 1–2 psig compressed air) to the probe from a compressed gas source.

The diameter $d_2$ of the second probe 26 desirably is between about 3–5 mm, with 4.75 mm being a specific example, although larger or smaller diameter probes also may be used. For use with seeds of *Arabidopsis thaliana*, the aperture 94 in the second probe 26 desirably is about 100 to 160 microns in diameter, although the size and shape of the aperture 94 may vary depending on the size of the seed to be picked up. By way of further example, the mesh sizes for the first probe 24 and the aperture sizes for the second probe 26 described above can be within a size range appropriate for manipulating seeds from any of various genera from the family Orchidaceae.

In the seed-planting methods described herein, the second probe 26 is used to deposit or plant a single seed in selected planting chambers 18. Other methods, however, may involve planting a seed sample comprising more than one seed in selected planting chambers. In such cases, the number of apertures in the end surface of the second probe 26, and thereby the number of seeds picked up by the second probe 26, may be selected to correspond to the number of seeds to be planted in a planting chamber. For example, if two seeds are to be planted in a planting chamber, then the second probe 26 may be provided with two apertures so that at least two seeds can be picked up on the end surface of the probe.

A suitable vacuum-sensing device, such as a conventional vacuum sensor 96 (FIG. 8), may be provided to sense the vacuum level in the second probe 26. The vacuum sensor 96 desirably is operatively connected to the control unit 42. In this manner, the control unit 42 can be programmed to read measurements taken by the vacuum sensor as the second probe 26 is moved along the bottom of the alignment trough 110 for picking up seeds. Whenever a decrease in vacuum in the second probe 26 is sensed by the vacuum sensor 96, indicating that a seed has been picked up by the second probe 26, the control unit 42 moves the second probe 26 out of and away from the alignment trough 110 to a position just above a selected planting chamber 18 for planting the seed.

The apparatus 10 may also be provided with suitable indicating elements for placing in any seed-less planting chambers (planting chambers in which a seed had not been planted during a seed-planting operation). In this manner, personnel monitoring the growth of the seeds in the planting chambers will be able to easily identify and distinguish the seed-less planting chambers from those planting chambers in which a seed had been planted but no growth occurred.

As shown in FIGS. 1, 2 and 5, for example, indicating elements are provided in the form of a plurality of indicating balls 130, although other forms of indicating elements also may be used. The balls 130 are contained in an elongated tube 132, which is supported on the support surface 12 by, for example, a first tube support 134 and a second tube support 136. The tube 132 may be supported at an angle with respect to the support surface 12 to cause the balls 130 to roll out of a lower end 140 of the tube 132 and onto the first tube support 134. The first tube support 134 has a stop 138 to prevent the balls from rolling onto the support surface 12. The cover-removal manipulator 30 may be used to transfer the balls 130 from the first tube support 134 to selected planting chambers.

Completing the description of the embodiment shown in FIGS. 1 and 2, the apparatus further includes a cleaning station 104 that comprises a housing having a pair of ports 106, 108 for receiving the ends of respective probes 24, 26 therein. The ports 106, 108 are connected to a compressed-gas source for selectively applying compressed gas (e.g., compressed air) to the respective probes 24, 26 for purposes of removing any seed debris remaining on the probes between successive seed-planting operations. Alternatively, the probes 24, 26 may be subjected to a stream of compressed gas outside of any housing, although this may be less desirable in that any seed debris removed from the probes will not be contained for disposal. In another embodiment, the ports 106, 108 are filled with a cleaning solution. In the latter configuration, additional ports may be provided for drying the probes 24, 26 by, for example, applying compressed gas to the probes or flowing a hot gas over the probes.

In one approach for planting seeds with the apparatus 10, the first probe 24 is used for removing the entire seed population from a donor jar and depositing the seeds in the alignment trough 110, wherein the seeds become dispersed along the bottom 118 of the alignment trough 110. When releasing the seed population into the alignment trough 110, it is desirable to apply a low-pressure gas to the first probe 24, as this ensures that all seeds are released from the probe and adequately dispersed along the bottom of the alignment trough 110.

To remove individual seeds from the alignment trough 110 for planting in selected planting chambers, the end surface 92 of the second probe 26 is lowered to a position just above one end of the bottom 118 of the alignment trough 110 (FIG. 2). The second probe 26 is then moved longitudinally of the trough 110 (e.g., in the x-direction in FIGS. 2 and 5) until the vacuum sensor 96 indicates that a first seed has been picked up by the second probe 26. The second probe 26 is then raised out of the alignment trough 110 and moved to a position just above a selected planting chamber 18, at which point the vacuum on the second probe 26 is removed to release the seed into the planting chamber. Low-pressure air may be applied to the second probe 26 to facilitate release of the seed.

After the first seed is planted, the second probe 26 can be moved back to the trough 110 to repeat the seed-planting operation for another seed in the alignment trough. This process can be repeated until all of the seeds in the alignment trough 110 have been planted in respective planting chambers 18. Thereafter, the seed population of another donor jar 14 can be deposited into the alignment trough 110 with the first probe 24 and the seed-planting operation can be carried out for each seed in the alignment trough. This procedure can be repeated for each donor jar 14 until all of the planting chambers 18 have received at least one seed.

In some cases, it may be desirable to limit the number of seeds from each seed population (i.e., the seeds in a donor jar 14) that are planted in respective planting chambers 18. In one approach, for example, the number of seeds from each seed population that are planted is equal to a multiple of the number of planting chambers 18 in each row of planting chambers in a planting tray 16. This prevents seeds from different seed populations from being planted in the same row of a planting tray 16. When using planting trays 16 each having a 6×12 array of planting chambers 18, for example, the number of seeds to be planted from each seed population may be limited to a maximum of eighteen seeds from each seed population so that no more than three rows of planting chambers 18 (6 planting chambers per row) will receive seeds from a seed population.

If a seed population has more than the maximum number of seeds to be planted (e.g., more than 18), the additional seeds may be removed and deposited back into the donor container 14 from which the seeds were originally removed. This may be accomplished by "sweeping" the first probe 24 along the bottom 118 of the trough 110 until all of the seeds have been picked up by the first probe 24. The first probe 24 can then be moved back to the associated donor container 14 for depositing the seeds therein.

On the other hand, if a seed population has less than the maximum number of seeds which may be planted (e.g., less than 18 seeds), then an indicating element (e.g., a ball 130) may be positioned in the seed-less planting chambers to facilitate identification of those planting chambers.

More specifically, FIGS. 9A–9D are a flow diagram illustrating in detail a program (either software or hard-wired program) according to one specific embodiment for carrying out a seed-planting process using the apparatus 10. The illustrated program is configured to allow for the planting of seeds in planting trays having either a 6×12 array of planting chambers (such as shown in FIG. 5) or a 13×22 array of planting chambers. In either case, two planting trays of the same configuration will be provided for receiving seeds. In other embodiments, however, the number of planting trays and/or the number of planting chambers per tray can be varied.

In addition, the program allows for a maximum of 8 donor jars whenever 72-chamber planting trays (i.e., each tray having a 6×12 array of chambers) are selected and a maximum of 10 donor jars whenever 286-chamber planting trays (i.e., each tray having a 13×22 array of chambers) are selected. A seed population of approximately 18 seeds can be provided in each donor container 14 when using the 6×12 planting trays 16a, 16b shown in the illustrated embodiment. Alternatively, a seed population of approximately 52 seeds car be provided in each donor container 14 for use with the 13×22 planting trays. Of course, the number of donor jars 14 and/or the number the seeds per donor jar to be planted can be varied depending upon the particular application.

In the flow diagram, the following variables are specified by the operator and/or tracked by the program:

1. "Y" is the number of planting chambers (or cells) 18 in each planting tray 16;
2. "N" is the number of available donor jars (or tubes) 14 from which seeds will be taken;
3. "J" is a counter that represents the number of the current donor jar 14 from which seeds are being taken;
4. "K" is a counter that represents the number of the current planting tray 16 into which seeds are being planted;
5. "L" is a counter that represents the number of the current planting chamber 18 (or cell);
6. "M" is a counter for the quantity of seeds from each donor tube J that have been planted; and
7. "X" is a counter representing the movement of the second probe 26 along the bottom of the alignment trough 110.

Figure 9A:
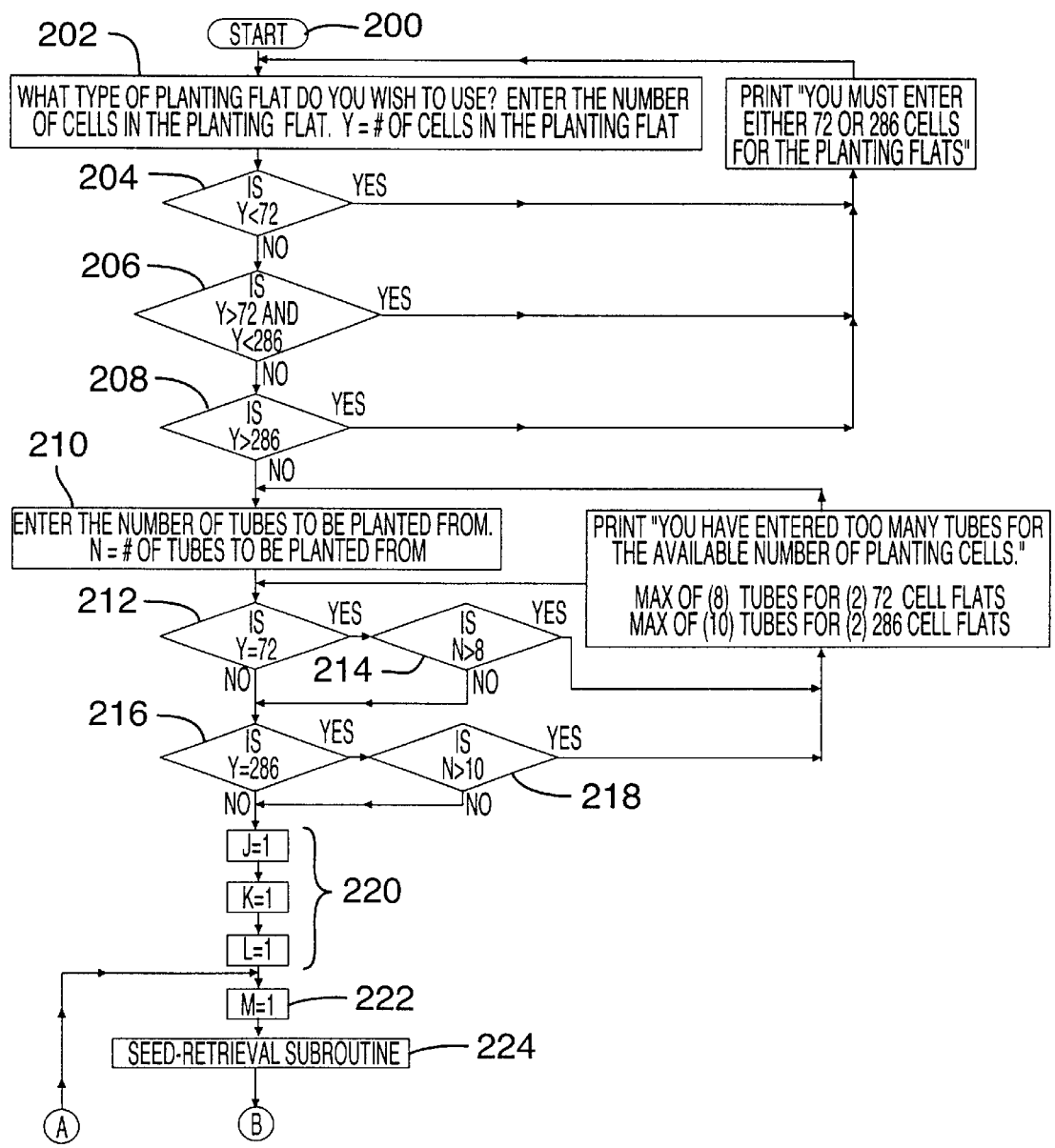
FIGS. 9A–9D are respective portions of a flow diagram of a seed-planting program according to one embodiment for planting seeds using the apparatus of FIGS. 1 and 2.

Referring to FIG. 9A, the program starts at block 200 and then proceeds to input block 202, at which point the user selects either the 72-chamber trays or the 286-chamber trays for use in the planting process. The program confirms at blocks 204, 206, and 208 that a proper selection has been made. At input block 210, the user enters the number of donor tubes (jars) from which seeds will be taken. The program confirms at blocks 212 and 214 that no more than 8 donor tubes have been entered for use with the 72-chamber trays, and confirming at blocks 216 and 218 that no more than 10 donor tubes have been entered for use with the 286-chamber trays.

The program initializes variables J, K, and L to one, as indicated generally at 220, and variable M to one at block 222, then proceeds to the first seed-retrieval step, using a seed-retrieval subroutine indicated at process block 224, which will be detailed below with reference to FIG. 9E. The first seed-retrieval step operates to remove all of the seeds from the first donor jar (J=1) with the first probe 24 and to deposit the seeds in the alignment trough 110.

Figure 9B:
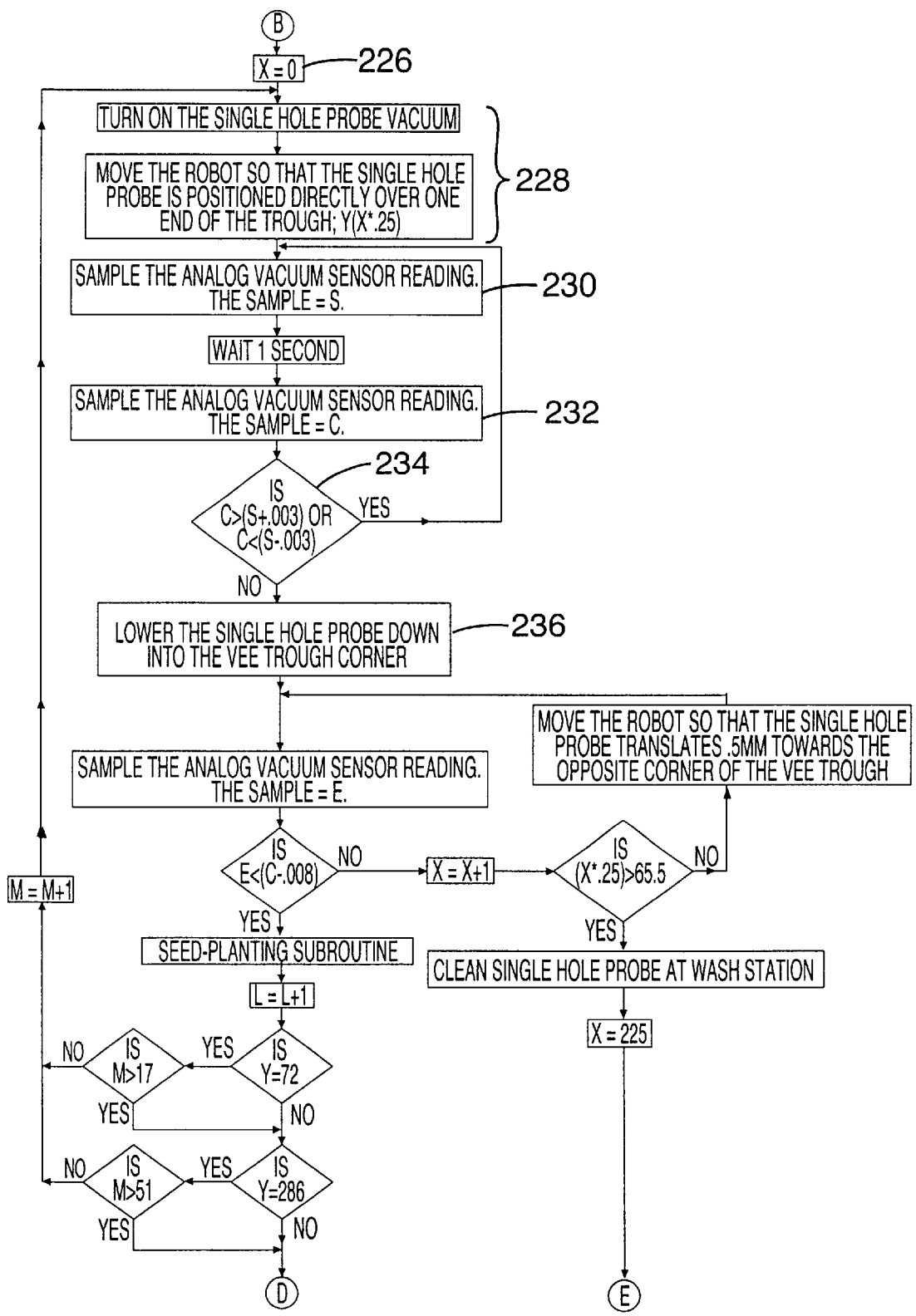

After the seed-retrieval step, as shown in FIG. 9B, the program initializes the value of X to zero (block 226), after which the vacuum to the second probe 26 is activated and the second probe 26 is moved into position directly above one end of the bottom 118 of the alignment trough 110 (as indicated generally at 228). The control unit 42 reads the output of the vacuum sensor 96 at blocks 230 and 232, and confirms at block 234 that the vacuum applied to the second probe 26 is stable to within an acceptable degree.

If the vacuum to the second probe 26 is sufficiently stable, then the second probe 26 is lowered to a position just above one end of the bottom 118 of the alignment trough 110 (block 236), after which the control unit 42 again reads the output of the vacuum sensor 96 (block 238). The program then determines at decision block 240 whether the change in the level of vacuum in the second probe 26 is greater than a predetermined value.

If the change in vacuum exceeds the predetermined value, indicating that the second probe 26 has picked up a seed, the programs proceeds to the first seed-planting step, using a seed-planting subroutine indicated at process block 248, which will be detailed below with reference to FIG. 9F. The first seed-planting step operates to raise the second probe 26 out of the alignment trough 110, move the second probe 26 to a position above the first planting cell (L=1), and deposit the seed into the first planting cell.

If, on the other hand, the change in vacuum does not exceed the predetermined value (as determined at decision block 240), indicating that the second probe 26 has not picked up a seed, the program proceeds to increment the value of X at block 242. The program then executes an algorithm at decision block 244 to determine the position of the second probe 26 relative to the far, or opposite, end of the bottom 118 of the alignment trough 110 (i.e., the end opposite the end at which the second probe 26 is positioned at block 236). If it is determined that the second probe 26 is not at the far end of the alignment trough 110, the second probe 26 is moved a predetermined distance (e.g., 5 mm) toward the opposite end, as indicated at block 246. The program then loops back to blocks 238 and 240 to read the output of the vacuum sensor and to determine whether the second probe 26 has picked up a seed, respectively. The program repeats itself in accordance with the process loop defined by blocks 238, 240, 242, 244, and 246 to move the second probe 26 along the bottom of the trough until a seed is picked up (block 240) or the second probe reaches the far end of the alignment trough 110 without picking up a seed (block 244).

Figure 9C:
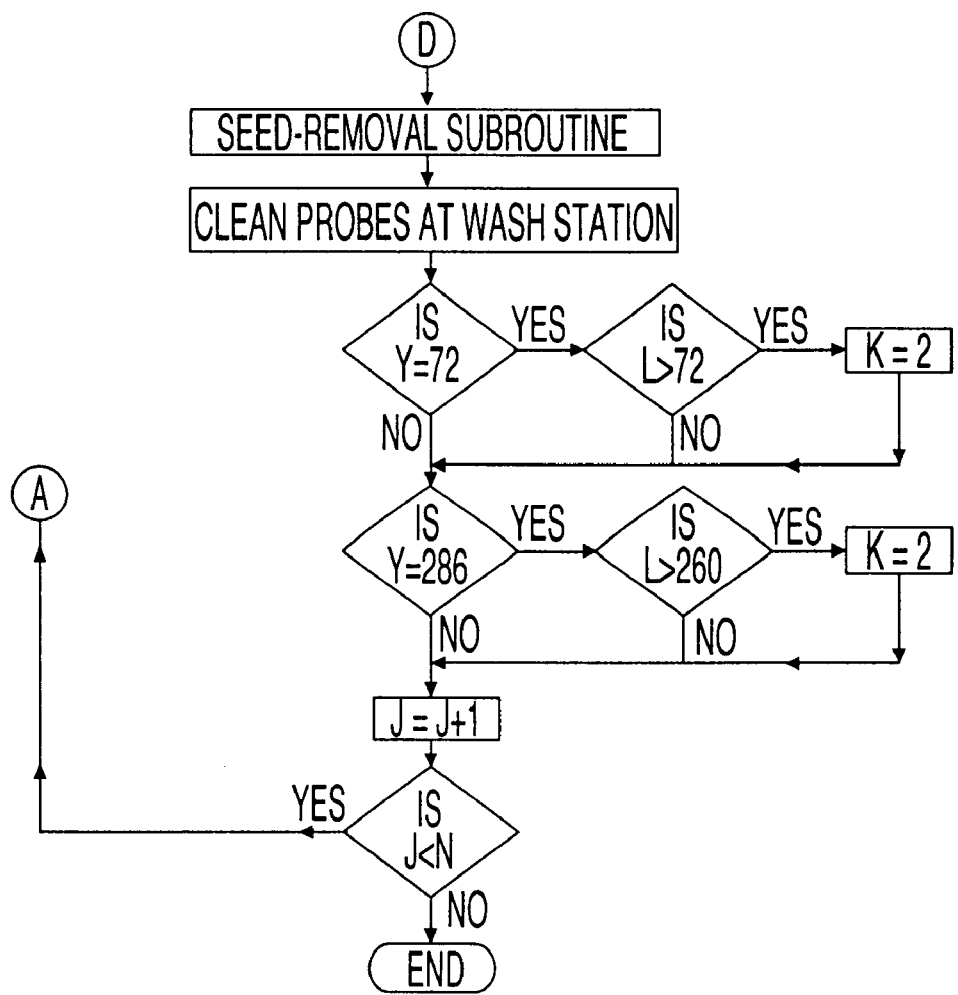

As mentioned, whenever the second probe 26 picks up a seed in the alignment trough 110, the seed-planting subroutine is carried out for the seed (block 248) and the value of L (the planting-chamber number) is incremented at block 250. If the 72-chamber trays are being used (as determined at block 252), then the program proceeds to block 254 to determine whether the maximum number of seeds from the current donor population (e.g., 18 in this case) have been planted. On the other hand, if the 286-chamber trays are being used (as determined at block 256), then the program proceeds to block 258 to determine whether the maximum number of seeds from the current donor population (e.g., 52 in this case) have been planted. If the answer is "no" for either the 72-chamber or 286-chamber trays, the program increments the value of M (block 260) and loops back to a point in the program immediately following block 226 for retrieving another seed from the alignment trough 110. This process is repeated until a predetermined number of seeds in the alignment trough 110 (up to 18 or 52 seeds) have been planted in corresponding planting cells 18, at which point the program proceeds to the first seed-removal step, using a seed-removal subroutine indicated at process block 262 (FIG. 9C). The seed-removal subroutine is described in greater detail below with reference to FIG. 9H. The first seed-removal step operates to sweep the first probe 24 along the bottom 118 of the alignment trough 110 for picking up any additional seeds, move the first probe 24 to a position above the first donor jar (J=1), and deposit the additional seeds back into the first donor jar.

After the seed-removal step is complete, the probes 24, 26 may be cleaned in the cleaning station 104 to remove any debris from the probes, as indicated at 264. Although not shown, the compressed air to the air knife 116 may be activated to clear out any debris in the alignment trough 110. As shown, the value of K (the planting-tray number) is increased to 2 to begin planting seeds in the second planting tray 16 when the value of L (the planting-chamber number) exceeds a predetermined value (72 chambers for a 72-chamber tray, as indicated at blocks 266 and 268, or 260 chambers for a 286-chamber tray, as indicated at blocks 270 and 272). The value of J (the donor-jar number) is incremented at block 274, after which the program loops back to a point just prior to block 222 (FIG. 9A) to execute a seed-retrieval step for the second donor jar (J=2) using the seed-retrieval subroutine at block 224. As mentioned, the seed-retrieval step operates to remove the seed population from the current donor jar 14 and deposit the seed population in the alignment trough 110. After the seed-retrieval step is completed, a predetermined number of seeds are planted in corresponding planting cells (FIG. 9B) and any additional seeds are transferred back to the current donor jar (block 262, FIG. 9C). This process is repeated for each donor jar (up to 8 jars when using the 72-chamber trays and up to 10 jars when using the 286-chamber trays), that is until J>N, as indicated at block 276.

As described above, a process loop defined by blocks 238, 240, 242, 244, and 246 of FIG. 9B operates to move the second probe 26 along the bottom of the alignment trough 110 until a seed is picked up (block 240) or the second probe reaches the opposite end of the alignment trough 110 without picking up a seed (block 244). The latter scenario can occur if a seed population had less than the allowable number of seeds to be planted (e.g., less than 18 if the 72-chamber trays are being used or less than 52 if the 286-chamber trays are being used).

A subroutine may be executed to confirm that there are no seeds remaining in the alignment trough 110. This may include optionally cleaning the second probe 26 at the cleaning station 104 (block 280), setting the value of X, for example, to 225 (block 282), and lowering the second probe 26 back into the alignment trough 110 (block 284 of FIG. 9D). By setting the value of X to 225, the second probe 26 is positioned intermediate the ends of the alignment trough, about 5/7 of the distance to the far end of the trough. Of course, the value assigned to X at block 282 can vary. In any event, a process loop defined by blocks 286, 288, 290, 292, and 294 operates to move the second probe 26 toward the far end of the alignment trough 110 until a seed is picked up (block 288) or the second probe reaches the opposite end of the alignment trough 110 without picking up a seed (block 292).

If the second probe 26 picks up a seed, the seed-planting subroutine is executed for the seed (block 296) and the program loops back to block 284, repeating the process until the maximum allowable number of seeds have been planted in corresponding planting cells 18. The program then continues at block 262 of FIG. 9C. If, however, the second probe 26 reaches the far end of the alignment trough 110 without picking up a seed, thereby confirming that there are no seeds remaining in the alignment trough 110 (and that the donor population had less than the allowable number of seeds to be planted), then the program proceeds to the ball-transfer subroutine at block 298.

The ball-transfer subroutine, which is described in greater detail below in connection with FIG. 9G, operates to pick up a ball 130 with the cover-removal manipulator 30 and place the ball in the current planting cell (L) to indicate that a seed has not been planted in that planting cell. After the ball 130 has been placed in a corresponding planting cell 18, the values of L and M are incremented, as indicated at blocks 300 and 302, respectively, until M>17 if the 72-chamber trays are being used, as indicated at block 304, or until M>51 if the 286-chamber trays are being used, as indicated at block 306. When one of the latter two conditions is satisfied, the value of L (the planting-chamber number) will be equal to the identification number of a planting chamber 18 at the beginning of a row of planting chambers (e.g., L=19, 37, 55, etc. if the 72-chamber trays are being used or L=53, 105, 157, etc., if the 286-chamber trays are being used). Accordingly, the first seed of the succeeding donor population removed from the alignment trough 110 will be planted in a planting chamber 18 at the beginning of a row of planting chambers.

Figure 9D:
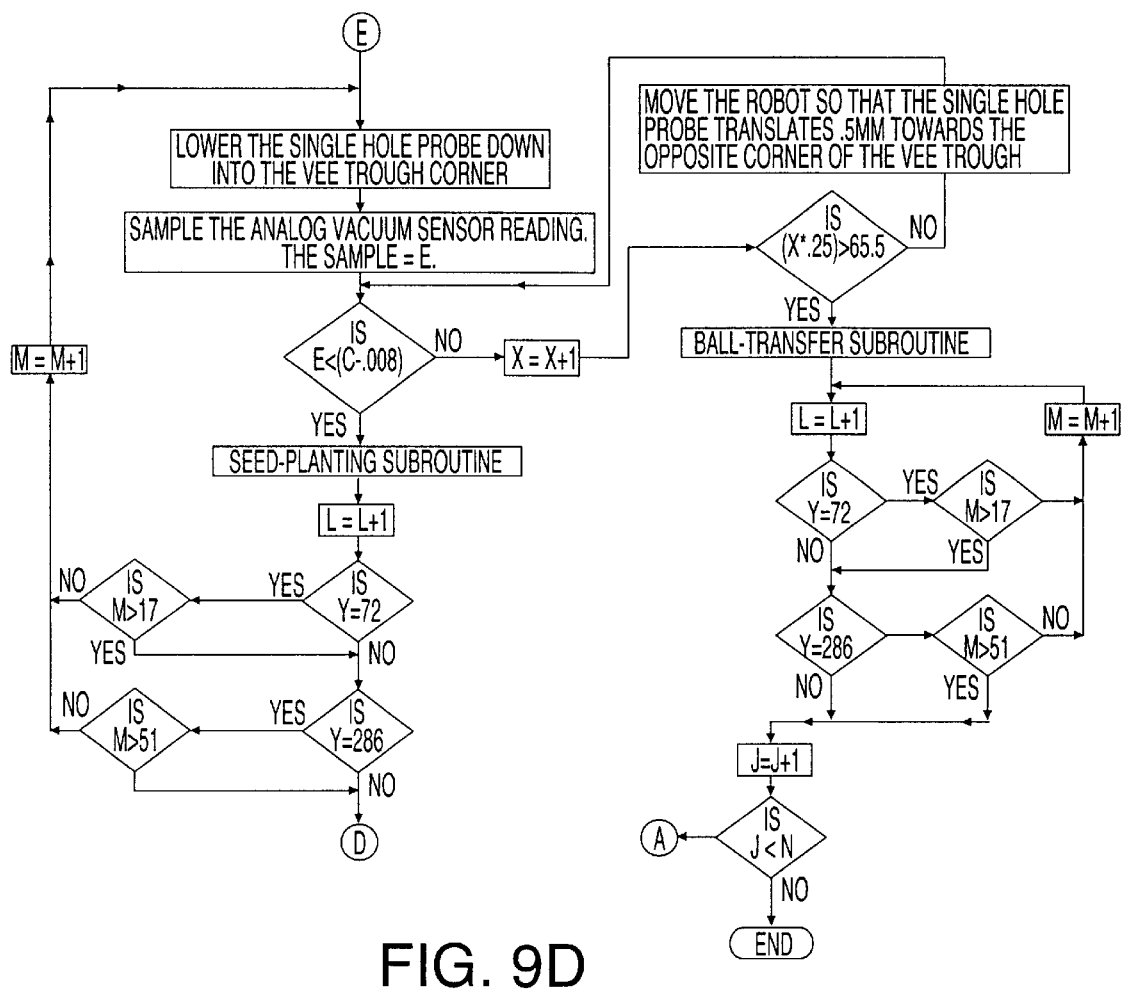

In the method illustrated in FIG. 9D, a ball 130 is placed in the first planting chamber 18 for which a seed is not available, but not in any other planting chambers in the same row for which seeds are not available. It should be recognized that the use of a single ball 130 is sufficient to indicate that the respective planting chamber 18 that contains the ball, and any other planting chambers of a higher number in the same row, do not contain a seed. This is because the first seed of the next donor population will be planted in the first planting chamber 18 of the next row. However, if desired, a ball 130 may be placed in each planting chamber 18 that does not contain a seed. In addition, in other embodiments, the program may proceed directly from block 244 of FIG. 9B to the ball-transfer subroutine at block 298 of FIG. 9D, without first executing the subroutine described above for confirming whether there are any seeds remaining in the alignment trough 110.

In any event, as shown in FIG. 9D, the program increments the value of J (the donor-jar number) at block 308. If the condition at block 304 is not satisfied (indicating that there are remaining donor jars 14), then program loops back to a point just prior to block 222 (FIG. 9A) to execute another seed-retrieval step for the next donor jar.

Figures 9E, 9F:
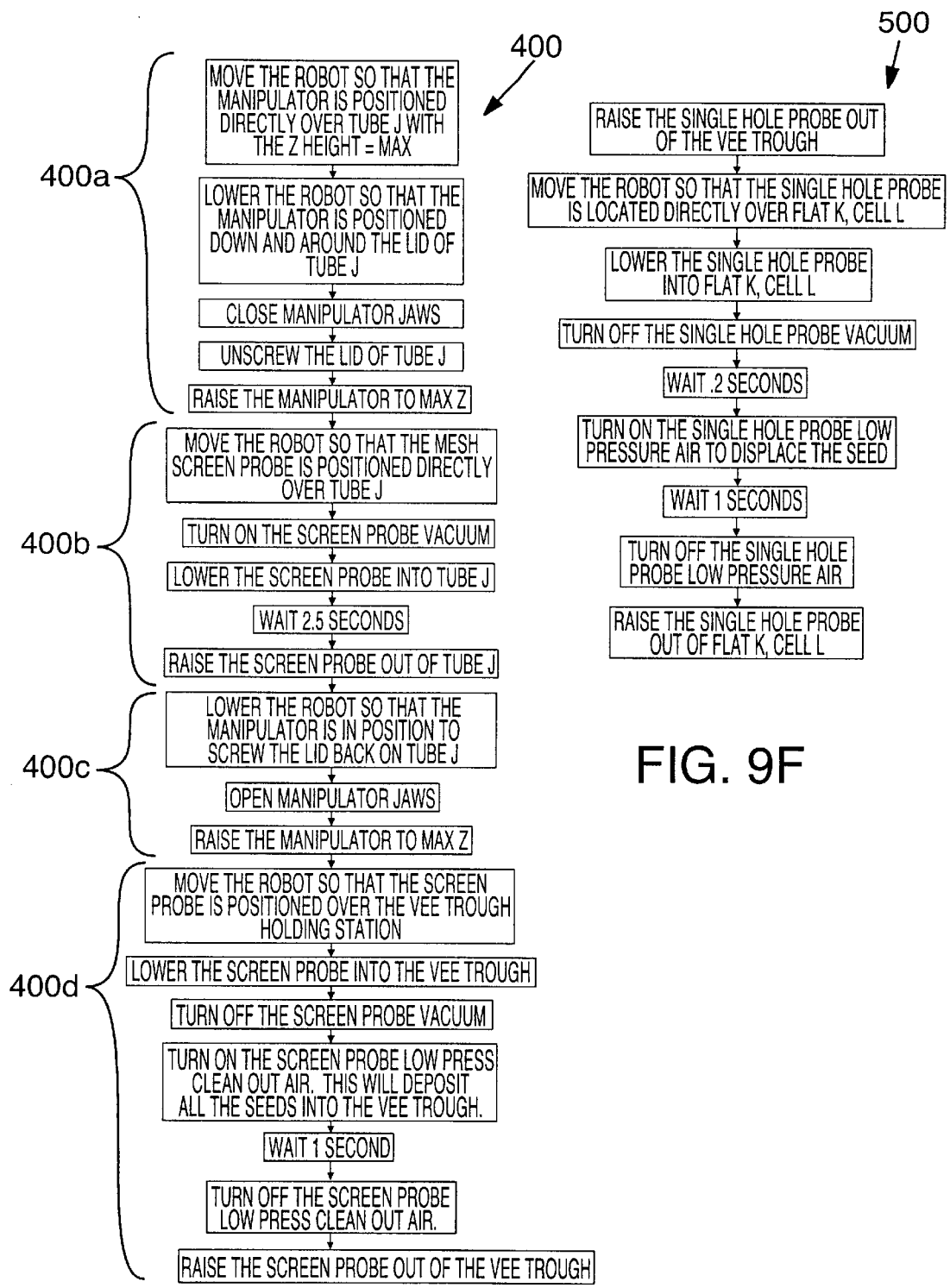
FIG. 9E is a flow diagram of the seed-retrieval subroutine of FIG. 9A.
FIG. 9F is a flow diagram of the seed-planting subroutine of FIGS. 9B and 9D.
Figure 9G:
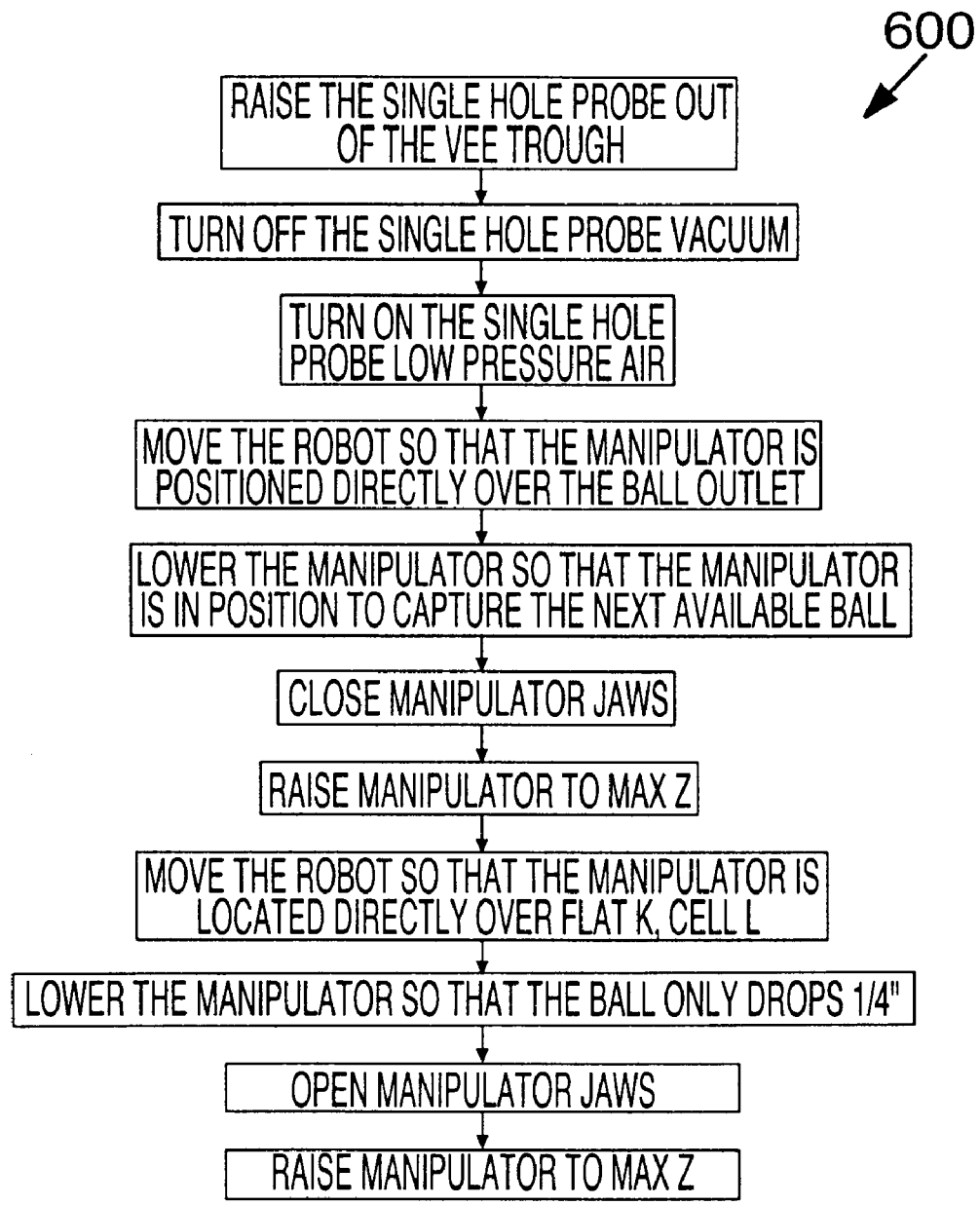
FIG. 9G is a flow diagram of the ball-transfer subroutine of FIG. 9D.
Figures 9H, 9I:
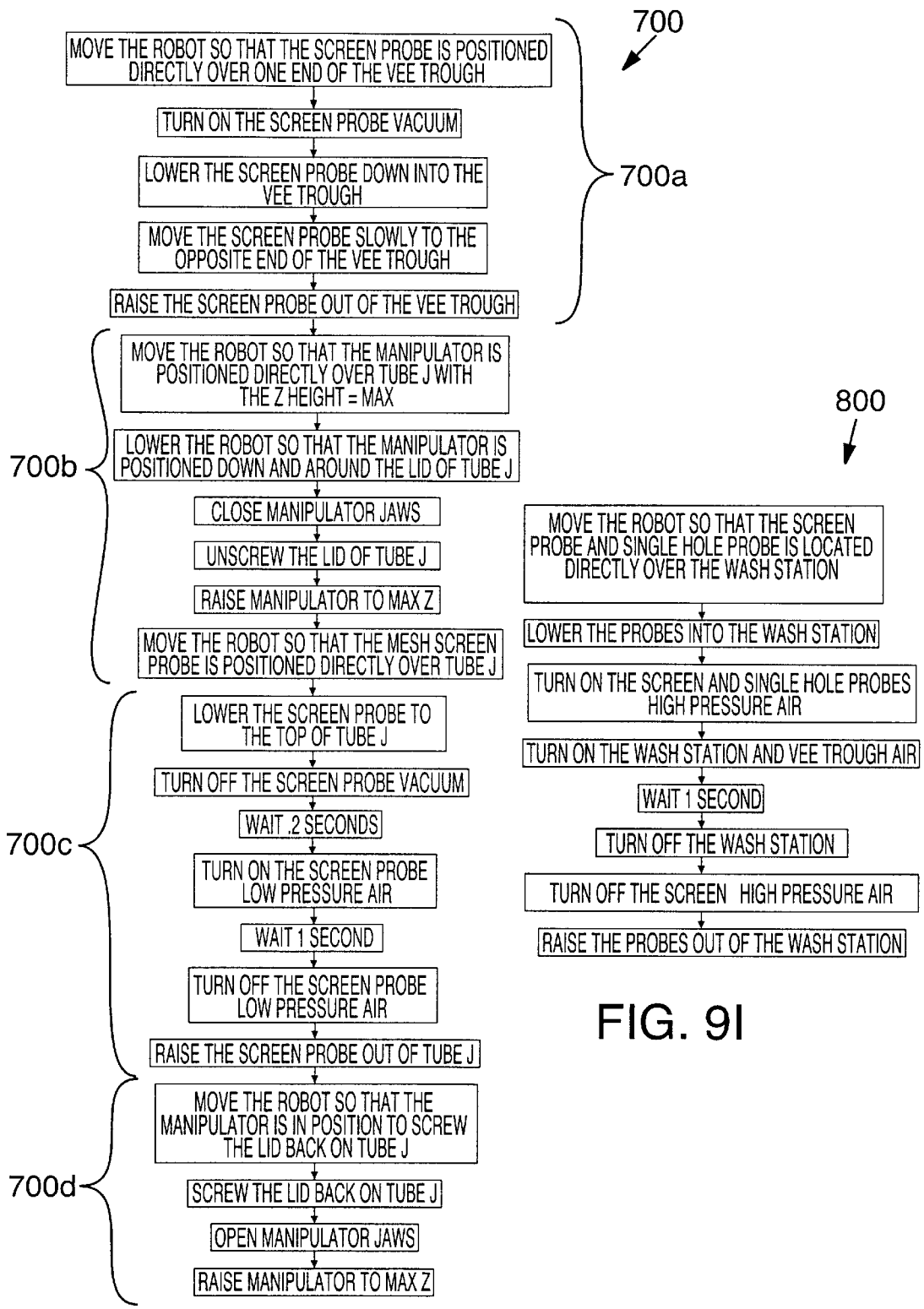
FIG. 9H is a flow diagram of the seed-removal subroutine of FIG. 9C.
FIG. 9I is a flow diagram of the probe-cleaning subroutine of FIGS. 9B, 9C and 9D.

The seed-planting method given in FIGS. 9A–9D involves (i) steps for transferring a seed population from a selected donor jar 14 to the alignment trough 110, shown generally at 400 in FIG. 9E, (ii) steps for transferring individual seeds from the alignment trough 110 to selected planting cells 18, shown generally at 500 in FIG. 9F, (iii) steps for transferring an indicating ball 130 from the tube support 134 to selected planting cells 18, shown generally at 600 in FIG. 9G, (iv) steps for transferring seeds from the alignment trough 110 to a selected donor jar 14, shown generally at 700 in FIG. 9H, and (v) steps for cleaning the first and second probes 24, 26, respectively, at the cleaning station 104, as shown generally at 800 in FIG. 9I.

With specific reference to FIG. 9E, if the user specifies that the donor jars 14 have covers, then the cover-removal manipulator 30 is operated to remove the cover of the current donor jar 14, as indicated generally at 400a. As described, initial movement of the head assembly 28 to remove a cover results in placement of the jaws 66 of the manipulator 30 directly above the current jar, at which point the cover-removal manipulator 30 is moved downward in the z direction to a position to engage the cover. After the manipulator 30 has been activated to engage the cover and remove the cover from the selected jar 14, and with the cover held in the clamping jaws 66, the cover-removed manipulator 30 is raised in the z direction.

The head assembly 28 is then shifted in its x-y position to place the appropriate seed pick-up probe directly above the now-opened jar, as indicated generally at 400b. Of course, if the donor jars 14 do not have covers, then the program skips the steps at 400a and proceeds directly to the first step at 400b. In either case, the probe referred to at 400b desirably is the first probe 24 (FIGS. 6A and 6B), which, as previously explained, is designed to pick up most, if not all, of the seed population in a donor jar. To pick up the seeds in the donor jar 14, the first probe 24 is lowered in the donor jar, and the vacuum supply to the device is activated so that seeds are drawn to and held by the negative pressure at the openings of the end surface 86 of the probe 24.

After seed pick-up from the opened donor jar 14, the head assembly 28 is shifted again to place the cover-removal manipulator 30 directly above the jar. The cover-removal manipulator is activated to screw the cover back on the jar and then release the cover from the jaws 66, as indicated at 400c. To deposit the seeds into the alignment trough 110, the head assembly 28 is shifted to place the first probe 24 at a position above the alignment trough 110, as indicated at 400d. The first probe 24 is lowered into the alignment trough 110 and the vacuum supply to the probe is released to cause the seeds to fall into the alignment trough. The low-pressure air supply to the first probe 24 may be activated to ensure that all seeds are released from the probe.

FIG. 9F shows a flow chart for the seed-planting subroutine according to one embodiment, indicated generally at 500. Whenever the second probe 26 picks up a seed in the alignment trough 110 (e.g., at block 240 of FIG. 9B or block 288 of FIG. 9D), the second probe is raised out of the alignment trough in the z-direction and the head assembly 28 is shifted to place the second probe directly over the current planting cell 18. The second probe 24 is lowered into the planting cell and the vacuum supply to the probe is released to cause the seed to fall into the planting cell. The low-pressure air supply to the second probe may be activated to ensure that the seed is released from the probe.

Referring to FIG. 9G, a ball-transfer sub-routine according to one embodiment involves raising the second probe 26 out of the alignment trough 110 and shifting the x-y position of the head assembly 28 so that the jaws 66 of the cover-removal manipulator 30 are situated directly above a ball 130 supported on the first tube support 134. The cover-removal manipulator 30 is lowered to a position to engage the ball. After the ball has been grasped by the jaws 66 of the cover-removal manipulator, the cover-removal manipulator is raised. The head assembly 28 is shifted to place the cover-removal manipulator 30 directly above the current planting cell 18. The manipulator is then lowered and the jaws 66 are activated to release the ball 130 into the planting cell 18.

Referring to FIG. 9H, a seed-removal subroutine according to one embodiment involves shifting the x-y position of the head assembly 28 so that the first probe 24 is positioned directly above one end of the alignment trough 110, as indicated at 700a. The vacuum supply to the first probe 24 is activated and the first probe 24 is lowered into the alignment trough and then moved to the opposite end of the alignment trough, thereby picking up any seed(s) that lie along the bottom 118 of the trough. The head assembly 28 is shifted again to position the cover-removal manipulator 30 above the current donor jar 14. The cover-removal manipulator 30 is activated to remove the cover from the donor jar 14, as indicated at 700b. After the cover is removed from the donor jar, the head assembly 28 is shifted to place the first probe 24 into position above the donor jar, as indicated at 700c. The first probe 24 is lowered into the donor jar and the vacuum supply to the probe is released to cause the seed(s) to fall into the donor jar. The low-pressure air supply to the first probe 24 may be activated to ensure that all seeds are released from the probe. Finally, as indicated at 700d, the cover-removal manipulator 30 is operated to replace the cover on the donor jar.

FIG. 9I shows a flow chart for carrying out the probe-cleaning step. This step may involve cleaning either one probe only or both probes 24, 26 simultaneously. In this subroutine, the x-y position of the head assembly 28 is shifted to position the probes 24, 26 above respective ports 106, 108 in the cleaning station 104. One or both probes are lowered into the cleaning station 104 and cleaned, such as by "submersion" in a compressed air bath and/or by directing high-pressure air through the probes, to prevent any possibility of seed carryover. Cleaning of both probes 24, 26 is desirable after completing a seed-removal subroutine (as indicated at block 264 in FIG. 9C) and after completing of a ball-transfer routine (as indicated at block 299 in FIG. 9D). Alternatively, if desired, the program may exclude the probe-cleaning steps.

In an alternative method for planting seeds with the apparatus 10 of FIGS. 1 and 2, seeds may be removed from their respective donor containers 14 and deposited in selected planting chambers 18 with the second probe 26. In this case, the seed-alignment trough 110 and the first probe 24 can be optional.

The invention has been described with respect to particular embodiments and modes of action for illustrative purposes only. The present invention may be subject to many modifications and changes without departing from the spirit or essential characteristics thereof. We therefore claim as our invention all such modifications as come within the scope of the following claims.

We claim:

1. An apparatus for planting seeds, comprising:
   a first probe having an end surface configured to pick up a plurality of seeds whenever vacuum is applied to the probe and the end surface is positioned proximate the plurality of seeds;
   a seed-dispersing container for receiving the plurality of seeds from the first probe, wherein when the plurality of seeds are deposited in the seed-dispersing container, the seeds are caused to disperse and form an array along a surface of the seed-dispersing container; and
   a second probe for picking up and planting seeds deposited in the seed-dispersing container, the second probe having an end surface configured to pick up a selected number of seeds from the seed-dispersing container whenever vacuum is applied to the probe and the end surface is positioned proximate the seeds.

2. The apparatus of claim 1, wherein the end surfaces of the first and second probes are shaped to correspond to the shape of the seed-dispersing container.

3. The apparatus of claim 2, wherein the end surfaces of the probes are substantially V-shaped to correspond to the shape of the seed-dispersing container.

4. The apparatus of claim 1, wherein the seed-dispersing container is configured to form a seed-alignment trough.

5. The apparatus of claim 1, further comprising a plurality of planting chambers for receiving seeds from the second probe.

6. The apparatus of claim 5, further comprising a plurality of indicating elements for placing in any planting chambers that do not contain any seeds.

7. The apparatus of claim 1, wherein the first and second probes are carried by a robotic assembly configured to move in x, y and z dimensions to position the first and second probes at selected x-y-z positions.

8. The apparatus of 1, further comprising a probe-cleaning apparatus configured to remove debris from at least one of the first and second probes.

9. The apparatus of claim 1, wherein the end surface of the first probe comprises a mesh screen defining openings that are smaller than the seeds.

10. The apparatus of claim 9, wherein the openings of the mesh screen are about 100 to 150 microns in size.

11. The apparatus of claim 1, wherein the end surface of the second probe defines a selected number of openings for picking up a corresponding selected number of seeds, with each opening being dimensioned smaller than a seed.

12. The apparatus of claim 11, wherein the openings are about 100 to 160 microns in diameter.

13. The apparatus of claim 1 further comprising a vacuum-sensing device operatively connected to the second probe for sensing the vacuum in the second probe for detecting whether the end surface of the second probe has picked up any seeds from the seed-dispersing container.

14. The apparatus of claim 1, wherein when the plurality of seeds are deposited in the seed-dispersing container, the seeds are caused to disperse and form a linear array along a surface of the seed-dispersing container.

15. An apparatus for removing seeds contained in a donor container and for planting the seeds in selected planting cells, the apparatus comprising:
   seed-removal means for removing seeds from the donor container;
   seed-alignment means for receiving seeds from the seed-removal means, wherein seeds deposited in the seed-alignment means form a row of seeds therein; and
   seed-planting means for removing seeds from the alignment means and for planting the seeds in selected planting cells.

16. The apparatus of claim 15, wherein the seed-removal means and the seed-planting means are movable to selected positions in three-dimensional space, the apparatus further comprising means for controlling respective movements of the seed-removal means and the seed-planting means to selected positions in three-dimensional space.

17. The apparatus of claim 15, wherein the seed-alignment means comprises a seed-alignment trough.

18. The apparatus of claim 15, wherein seed-removal means is configured to pick up a plurality of seeds contained in the donor container, and the seed-planting means is configured to pick up individual seeds contained in the seed-alignment means.

19. The apparatus of claim 15, wherein the seed-removal means comprises a probe having an air-pervious end surface configured to pick up seeds upon application of a vacuum to the probe.

20. The apparatus of claim 15, wherein the seed-planting means comprises a probe having an end surface defining a selected number of openings for picking up a corresponding selected number of seeds upon application of a vacuum to the probe.

21. The apparatus of claim 20, wherein the end surface defines one opening for picking up one seed.

22. The apparatus of claim 15 further comprising indicating means for placing in a planting cell in which seeds have not been planted.

23. The apparatus of claim 15 further comprising means for sensing whether the seed-planting means has picked up any seeds from the seed-alignment means.

24. An apparatus for moving seeds, comprising:
a first probe configured to move in three-dimensional space, the first probe being fluidly connectable to a vacuum source and having an air-pervious end surface, wherein application of a vacuum from the vacuum source to the first probe is effective to cause the end surface to pick up a plurality of seeds and hold the plurality of seeds against the end surface, and wherein release of the vacuum from the first probe causes the end surface of the first probe to release the seeds;
a second probe configured to move in three-dimensional space, the second probe being fluidly connectable to a vacuum source and having an apertured end surface, wherein application of a vacuum from the vacuum source to the second probe is effective to cause the end surface of the second probe to pick up a selected number of seeds and hold the selected number of seeds against the end surface of the second probe, and wherein release of the vacuum from the second probe causes the end surface of the second probe to release the selected number of seeds;
a cover-removal manipulator configured to remove and replace a cover on a container containing the seeds.

25. The apparatus of claim 24 wherein the first probe, the second probe and the cover-removal manipulator are carried by a robotic assembly configured to move in three-dimensional space.

26. The apparatus of claim 24 further comprising a controller for controlling the movement of the first and second probes to selected positions in three-dimensional space.

27. The apparatus of claim 24, further comprising a seed-dispersing container for receiving a plurality of seeds from one or both of the first and second probes, wherein when the plurality of seeds are deposited in the seed-dispersing container, the seeds are caused to disperse and form an array along a surface of the seed-dispersing container.

28. The apparatus of claim 27, wherein the seed-dispersing container is configured to form a substantially linear array of seeds.

29. The apparatus of claim 27, wherein the seed-dispersing container has a generally V-shaped cross-section and the end surfaces of the probes are substantially V-shaped to correspond to the cross-sectional shape of the seed-dispersing container.

30. The apparatus of claim 24, further comprising a plurality of planting chambers for receiving seeds from one or both of the first and second probes.

31. The apparatus of claim 30, further comprising a plurality of indicating elements for placing in any planting chambers that do not contain any seeds.

32. A method of planting seeds comprising:
positioning a first probe at a first position to remove a plurality of seeds from a donor container, the first probe having an end portion defining a plurality of apertures each smaller than a seed;
applying a vacuum to the first probe to cause the first probe to pick up the plurality of seeds;
positioning the first probe at a second position to deposit the seeds carried by the first probe into a seed-alignment container;
releasing the vacuum from the first probe to cause the seeds carried by the first probe to be released into the seed-alignment container to align the seeds;
positioning a second probe at the seed-alignment container to remove a selected number of seeds from the seed-alignment container;
applying a vacuum to the second probe to cause the second probe to pick up a selected number of seeds from the seed-alignment container;
positioning the second probe at a third position to plant the selected number of seeds; and
releasing the vacuum from the second probe to cause the selected number of seeds to be released from the second probe for planting.

33. An apparatus for handling seeds, comprising:
means for picking up a plurality of loose seeds from a container;
means for picking up a selected number of loose seeds from a container; and
a seed-alignment means for receiving seeds from said means for picking up a plurality of seeds and for forming a row of seeds deposited therein;
wherein said means for picking up a plurality of seeds comprises a first probe having an end surface configured to pick up a plurality of seeds whenever vacuum is applied to the probe and the end surface is positioned proximately to the plurality of seeds;
said seed-alignment means comprises a seed-dispersing container for receiving the plurality of seeds from the first probe, wherein when the plurality of seeds are deposited in the seed-dispersing container, the seeds are caused to disperse and form an array along a surface of the seed-dispersing container; and
said means for picking up a selected number of seeds comprises a second probe for picking up and planting seeds deposited in the seed-dispersing container, the second probe having an end surface configured to pick up a selected number of seeds from the seed-dispersing container whenever vacuum is applied to the probe and the end surface is positioned proximately to the seeds.

34. The apparatus of claim 33, wherein:
said means for picking up a plurality of seeds comprises a first probe configured to move in three-dimensional space, the first probe being fluidly connectable to a vacuum source and having an air-pervious end surface, wherein application of a vacuum from the vacuum source to the first probe is effective to cause the end surface to pick up a plurality of seeds and hold the plurality of seeds against the end surface, and wherein release of the vacuum from the first probe causes the end surface of the first probe to release the seeds; and said means for picking up a selected number of seeds comprises a second probe configured to move in three-dimensional space, the second probe being fluidly connectable to a vacuum source and having an apertured end surface, wherein application of a vacuum from the vacuum source to the second probe is effective to cause the end surface of the second probe to pick up a selected number of seeds and hold the selected number of seeds against the end surface of the second probe, and wherein release of the vacuum from the second probe causes the end surface of the second probe to release the selected number of seeds.

* * * * *